(12) United States Patent
Adachi et al.

(10) Patent No.: US 9,831,498 B2
(45) Date of Patent: *Nov. 28, 2017

(54) ANODE AND SECONDARY BATTERY

(71) Applicant: Sony Corporation, Tokyo (JP)

(72) Inventors: Momoe Adachi, Tokyo (JP); Shunsuke Kurasawa, Fukushima (JP); Isamu Konishiike, Kanagawa (JP); Kenichi Kawase, Fukushima (JP)

(73) Assignee: SONY CORPORATION, Tokyo (JP)

( * ) Notice: Subject to any disclaimer, the term of this patent is extended or adjusted under 35 U.S.C. 154(b) by 149 days.

This patent is subject to a terminal disclaimer.

(21) Appl. No.: 14/302,531

(22) Filed: Jun. 12, 2014

(65) Prior Publication Data

US 2014/0295270 A1 Oct. 2, 2014

Related U.S. Application Data

(63) Continuation of application No. 12/409,138, filed on Mar. 23, 2009, now Pat. No. 8,795,886.

(30) Foreign Application Priority Data

Mar. 28, 2008 (JP) .................................. 2008-088238

(51) Int. Cl.
*H01M 4/38* (2006.01)
*H01M 4/04* (2006.01)
(Continued)

(52) U.S. Cl.
CPC ............. *H01M 4/386* (2013.01); *H01M 4/04* (2013.01); *H01M 4/13* (2013.01); *H01M 4/134* (2013.01);
(Continued)

(58) Field of Classification Search
None
See application file for complete search history.

(56) References Cited

U.S. PATENT DOCUMENTS 8,795,886 B2 * 8/2014 Adachi .................. H01M 4/04
  429/209
2007/0105017 A1 5/2007 Kawase et al.
(Continued)

FOREIGN PATENT DOCUMENTS

JP 11-135115 5/1999
JP 2003-162999 6/2003
(Continued)

OTHER PUBLICATIONS

Japanese Office Action issued in connection with counterpart Japanese patent application No. 2008-088238 dated Jan. 23, 2013.
(Continued)

*Primary Examiner* — Melvin C Mayes
*Assistant Examiner* — Michael Forrest
(74) *Attorney, Agent, or Firm* — Dentons US LLP

(57) ABSTRACT

A secondary battery capable of improving cycle characteristics is provided. An anode includes: an anode active material layer on an anode current collector, the anode active material layer including a plurality of anode active material particles, in which the average particle area of the plurality of anode active material particles observed from a surface of the anode active material layer is within a range of 1 $\mu m^2$ to 60 $\mu m^2$ both inclusive.

14 Claims, 11 Drawing Sheets

(51) Int. Cl.

| | | |
|---|---|---|
| *H01M 4/134* | (2010.01) | |
| *H01M 4/139* | (2010.01) | |
| *H01M 4/13* | (2010.01) | |
| *H01M 4/02* | (2006.01) | |
| *H01M 10/052* | (2010.01) | |

(52) U.S. Cl.
CPC ............ *H01M 4/139* (2013.01); *H01M 4/38* (2013.01); *H01M 4/387* (2013.01); *H01M 10/052* (2013.01); *H01M 2004/021* (2013.01)

(56) References Cited

U.S. PATENT DOCUMENTS

| | | |
|---|---|---|
| 2007/0202365 A1 | 8/2007 | Sawa et al. |
| 2008/0050652 A1 | 2/2008 | Hirose et al. |

FOREIGN PATENT DOCUMENTS

| | | |
|---|---|---|
| JP | 2004-349162 | 12/2004 |
| JP | 2005-158633 | 6/2005 |
| JP | 2005-293899 | 10/2005 |
| JP | 2006-196447 | 7/2006 |
| JP | 2007-128766 | 5/2007 |
| JP | 2007234336 | 9/2007 |
| JP | 2008-010394 | 1/2008 |
| JP | 2008041307 | 2/2008 |

OTHER PUBLICATIONS

Korean Patent Office Action dated Nov. 25, 2015 corresponding to Korean Serial No. 10-2009-0026579.

* cited by examiner

ANODE AND SECONDARY BATTERY

RELATED APPLICATION DATA

This application is a continuation of U.S. patent application Ser. No. 12/409,138 filed Mar. 23, 2009, the entirety of which is incorporated herein by reference to the extent permitted by law. The present application claims the benefit of priority to Japanese Patent Application No. JP 2008-088238 filed on Mar. 28, 2008 in the Japan Patent Office, the entirety of which is incorporated by reference herein to the extent permitted by law.

BACKGROUND OF THE INVENTION

1. Field of the Invention

The present invention relates to an anode including an anode active material layer on an anode current collector, and a secondary battery including the anode.

2. Description of the Related Art

In recent years, portable electronic devices such as video cameras, cellular phones, or notebook computers are widely used, and size and weight reduction in the portable electronic devices and an increase in longevity of the portable electronic devices have been strongly demanded. Accordingly, as power sources for the portable electronic devices, the development of batteries, specifically lightweight secondary batteries capable of obtaining a high energy density have been promoted.

Among them, a secondary battery (a so-called lithium-ion secondary battery) using insertion and extraction of lithium for charge-discharge reaction holds great promise, because the secondary battery is capable of obtaining a larger energy density, compared to a lead-acid battery or a nickel-cadmium battery.

The lithium-ion secondary battery includes a cathode, an anode and an electrolytic solution. The anode includes an anode active material layer on an anode current collector, and the anode active material layer includes an anode active material contributing to charge-discharge reaction.

As the anode active material, a carbon material such as graphite is widely used; however, with enhancement of performance and expansion of functions in portable electronic devices, a further improvement in battery capacity is desired recently, so it is considered to use a material having a higher capacity such as silicon instead of a carbon material, because the theoretical capacity of silicon (4199 mAh/g) is much larger than the theoretical capacity of graphite (372 mAh/g), so a large increase in battery capacity is expected.

As a method of forming the anode active material layer, various methods such as a vapor-phase method, a liquid-phase method, a sintering method, a spraying method and a coating method are used; however, to stably improve the performance of the secondary battery, the vapor-phase method or the like is more preferable than the coating method, because the anode active material is prevented from being finely divided, and electronic conductivity is improved by strongly integrating the anode current collector and the anode active material layer. Thereby, a superior battery capacity and superior cycle characteristics are obtained as described in, for example, Japanese Unexamined Patent Application Publication No. H11-135115.

However, in the case where the material having a higher capacity such as silicon is used as the anode active material, there is concern that the anode active material layer is easily swelled or shrunk during charge and discharge. Thereby, when the anode active material layer is swelled and shrunk largely, even if the anode current collector and the anode active material layer are strongly integrated, the anode active material layer may be broken into pieces, thereby sufficient characteristics may not be obtained.

To prevent the anode active material layer from being broken into pieces, various studies have been conducted. More specifically, there are proposed a technique in which first layers and second layers having different oxygen contents are included, the first layers and the second layers are alternately laminated has been proposed as described in, for example, Japanese Unexamined Patent Application Publication No. 2004-349162. Moreover, there is proposed a technique in which a metal element (a ferromagnetic metal element such as iron, nickel or cobalt) is included in an anode active material layer as described in, for example, Japanese Unexamined Patent Application Publication No. 2007-257866. In this case, a high-concentration metal layer containing a high concentration of a ferromagnetic metal element and a low-concentration metal layer containing a low concentration of a ferromagnetic metal element are included. In these techniques, as the swelling and shrinkage of the anode active material layer are reduced, the anode active material layer is less prone to being broken into pieces during charge and discharge.

SUMMARY OF THE INVENTION

In recent years, portable electronic devices have higher performance and more functions, and the portable electronic devices tend to need more power consumption, thereby secondary batteries are frequently charged and discharged, so that cycle characteristics tend to easily decline. Therefore, further improvement in cycle characteristics of the secondary battery is desired.

It is desirable to provide an anode and a secondary battery capable of improving cycle characteristics.

According to an embodiment of the invention, there is provided an anode including: an anode active material layer on an anode current collector, the anode active material layer including a plurality of anode active material particles, in which the average particle area of the plurality of anode active material particles observed from a surface of the anode active material layer is within a range of 1 $\mu m^2$ to 60 $\mu m^2$ both inclusive.

According to an embodiment of the invention, there is provided a secondary battery including a cathode, an anode and an electrolyte, in which the anode includes an anode active material layer on an anode current collector, the anode active material layer including a plurality of anode active material particles, the average particle area of the plurality of anode active material particles observed from a surface of the anode active material layer is within a range of 1 $\mu m^2$ to 60 $\mu m^2$ both inclusive.

The above-described "observed from a surface of the anode active material layer" means that a surface of the anode (the anode active material layer) is observed from a direction where the anode current collector and the anode active material layer are laminated through the use of a scanning electron microscope (SEM) at magnifications of 2000. Moreover, "the average particle area of the plurality of anode active material particles" means the average value of particle areas of a plurality of anode active material particles included in a predetermined observation area (42 $\mu m$ long and 64 $\mu m$ wide) in the case where image processing is performed on an SEM image obtained by observing the surface of the anode under the above-described conditions to calculate the particle area of each of the plurality of anode active material particles. Software having a function capable of executing the image processing or computing (so-called image processing software) is used for image processing and computing.

In the anode according to the embodiment of the invention, the average particle area of the plurality of anode active material particles observed from the surface of the anode active material layer is within a range of 1 μm² to 60 μm² both inclusive, so an internal stress associated with swelling and shrinkage of the anode active material layer during electrode reaction is distributed, and the shape stability of the whole anode is maintained. Thereby, in the secondary battery using the anode according to the embodiment of the invention, cycle characteristics may be improved.

Other and further objects, features and advantages of the invention will appear more fully from the following description.

DETAILED DESCRIPTION OF THE PREFERRED EMBODIMENTS

A preferred embodiment of the invention will be described in detail below referring to the accompanying drawings.

Figure 1:
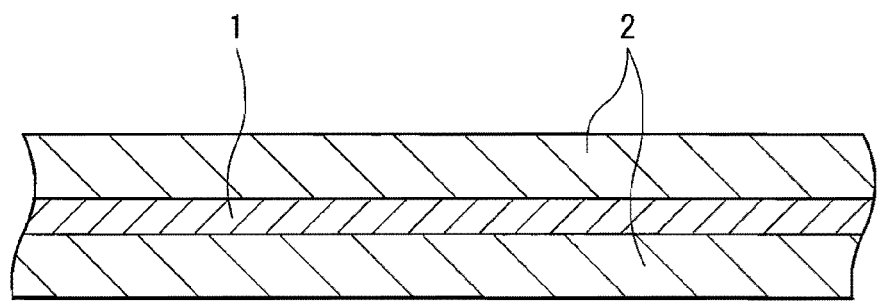
FIG. 1 is a sectional view of a configuration of an anode according to an embodiment of the invention.

FIG. 1 shows a sectional view of an anode according to an embodiment of the invention. The anode is used in, for example, an electrochemical device such as a secondary battery, and includes an anode current collector 1 having a pair of surfaces, and an anode active material layer 2 arranged on the anode current collector 1.

The anode current collector 1 is preferably made of a material having good electrochemical stability, electrical conductivity and mechanical strength, more specifically a material including one kind or two or more kinds of metal elements, as constituent elements, which do not form an intermetallic compound with an electrode reactant. Examples of such a metal material include copper (Cu), nickel (Ni), titanium (Ti), iron (Fe), chromium (Cr), stainless and the like.

The above-described material preferably includes one kind or two or more kinds of metal elements, as constituent elements, which are alloyed with the anode active material layer 2, because adhesion between the anode current collector 1 and the anode active material layer 2 is improved, so the anode active material layer 2 is less prone to being peeled from the anode current collector 1. Examples of metal elements which do not form an intermetallic compound with an electrode reactant, and are alloyed with the anode active material layer 2 include copper, nickel, iron and the like in the case where the anode active material layer 2 includes silicon as an anode active material. These metal elements are preferable in terms of strength and electrical conductivity.

The anode current collector 1 may have a single-layer configuration or a multilayer configuration. In the case where the anode current collector 1 has a multilayer configuration, for example, it is preferable that a layer adjacent to the anode active material layer 2 is made of a metal material which is alloyed with the anode active material layer 2, and a layer not adjacent to the anode active material layer 2 is made of any other metal material.

The surface of the anode current collector 1 is preferably roughened, because adhesion between the anode current collector 1 and the anode active material layer 2 is improved by a so-called anchor effect. In this case, at least a surface facing the anode active material layer 2 of the anode current collector 1 may be roughened. As a roughening method, for example, a method of forming fine particles by electrolytic treatment or the like is used. The electrolytic treatment is a method of forming fine particles on the surface of the anode current collector 1 in an electrolytic bath by an electrolytic method to form a roughened surface. Copper foil formed by the electrolytic treatment is generally called "electrolytic copper foil".

The anode active material layer 2 includes a plurality of anode active material particles, and the anode active material layer 2 may include any other material such as an anode conductor, if necessary. The anode active material particles include one kind or two or more kinds of anode materials capable of inserting and extracting an electrode reactant (for example, lithium or the like).

Examples of the anode material capable of inserting and extracting an electrode reactant include a material capable of inserting and extracting the electrode reactant and including at least one kind selected from the group consisting of metal elements and metalloid elements as a constituent element, because a high energy density is obtained. Such a material may be any one of the simple substances, alloys and compounds of metal elements and metalloid elements, or may include a phase including one kind or two or more kinds selected from them at least in part. In the present invention, the alloy means an alloy including two or more kinds of metal elements as well as an alloy including one or more kinds of metal elements and one or more kinds of metalloid elements. Moreover, the alloy may include a non-metal element. The texture of the alloy is a solid solution, a eutectic (eutectic mixture), an intermetallic compound or the coexistence of two or more kinds selected from them.

Examples of the above-described metal elements and the above-described metalloid element include metal elements and metalloid elements capable of forming an alloy with an electrode reactant. Specific examples include magnesium (Mg), boron (B), aluminum (Al), gallium (Ga), indium (In), silicon, germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt) and the like. Among them, at least one kind selected from the group consisting of silicon and tin is preferable, and silicon is more preferable, because silicon has a high capability of inserting and extracting an electrode reactant, so a high energy density is obtained.

Examples of a material including silicon as a constituent element include the simple substance, alloys and compounds of silicon, and a material including a phase of one kind or two or more kinds selected from them at least in part.

Examples of alloys of silicon include alloys including at least one kind selected from the group consisting of tin, nickel, copper, iron, cobalt (Co), manganese (Mn), zinc, indium, silver, titanium, germanium, bismuth, antimony (Sb) and chromium as a second constituent element in addition to silicon. Examples of compounds of silicon include compounds including oxygen (O) or carbon (C), and the compounds may include the above-described second constituent element in addition to silicon. Examples of the alloys of silicon and compounds of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq 2$), $SnO_w$ ($0<w\leq 2$), LiSiO and the like.

The anode active material layer 2 is formed by, for example, a vapor-phase method, a liquid-phase method, a sintering method, a spraying method, or a combination of two or more methods selected from them, that is, a method not needing an anode binder. As the vapor-phase method, for example, a physical deposition method or a chemical deposition method, more specifically, a vacuum evaporation method, a sputtering method, an ion plating method, a laser ablation method, a thermal chemical vapor deposition (CVD) method, a plasma chemical vapor deposition method or the like is used. As the liquid-phase method, a known technique such as electrolytic plating or electroless plating may be used. The sintering method is, for example, a method in which a particulate anode active material is mixed with a binder or the like to form a mixture, and the mixture is dispersed in a solvent, and is applied, and then the mixture is heated at a higher temperature than the melting point of the binder or the like. As the sintering method, a known technique may be used, and, for example, an atmosphere firing method, a reaction firing method or a hot press firing method is used.

In the case where the anode active material layer 2 is formed by a deposition method such as the vapor-phase method, the anode active material layer 2 may have a single-layer configuration formed by performing a deposition step once, or a multilayer configuration formed by repeating the deposition step a plurality of times. However, in the case where a vacuum evaporation method or the like associated with high heat during deposition is used, to prevent thermal damage to the anode current collector 1, the anode active material layer 2 preferably has a multilayer configuration, because when the deposition step is performed a plurality of times separately, a duration in which the anode current collector 1 is exposed to high heat is reduced, compared to the case where the deposition step is performed only once.

The anode active material layer 2 is preferably alloyed with the anode current collector 1, because the anode current collector 1 and the anode active material layer 2 are firmly coupled to be integrated, thereby electronic conductivity between them is improved, and the swelling and shrinkage of the anode active material layer 2 during electrode reaction is prevented. In this case, the anode current collector 1 and the anode active material layer 2 may be alloyed with each other in the whole region where they are adjacent to each other, or in a part of the region, because when the anode current collector 1 and the anode active material layer 2 are alloyed with each other at least in a part of the region, compared to the case where they are not alloyed with each other, adhesion between the anode current collector 1 and the anode active material layer 2 is improved. In addition, "alloying" means not only a state in which a constituent element of the anode current collector 1 and a constituent element of the anode active material layer 2 forms a perfect alloy but also a state in which the constituent elements are diffused into each other and mixed. In this case, in an interface between them, a constituent element of the anode current collector 1 may be diffused into the anode active material layer 2, or a constituent element of the anode active material layer 2 may be diffused into the anode current collector 1, or they may be diffused into each other.

Moreover, the anode active material layer 2 preferably includes a plurality of layers having different oxygen contents in a thickness direction, because swelling and shrinkage of the anode active material layer 2 during electrode reaction is prevented. In this case, the anode active material layer 2 preferably includes a plurality of layers of two kinds having different oxygen contents, and more preferably, the layers of two kinds are alternately laminated, because a higher effect is obtained. In the layers of two kinds having different oxygen contents, the oxygen contents may be clearly different from each other, or may not be clearly different from each other. In the latter case, preferably the oxygen contents are continuously changed. However, it is preferable that the oxygen contents in the layers of two kinds are not largely different from each other, because the oxygen contents are largely changed, ion diffusion may decline or resistance may be increased.

Examples of the anode conductor include carbon materials such as graphite, carbon black, acetylene black and ketjen black. Only one kind or a mixture of a plurality of kinds selected from them may be used. As long as the anode conductor is a material having electrical conductivity, any metal material or any conductive polymer may be used.

Figure 2A:
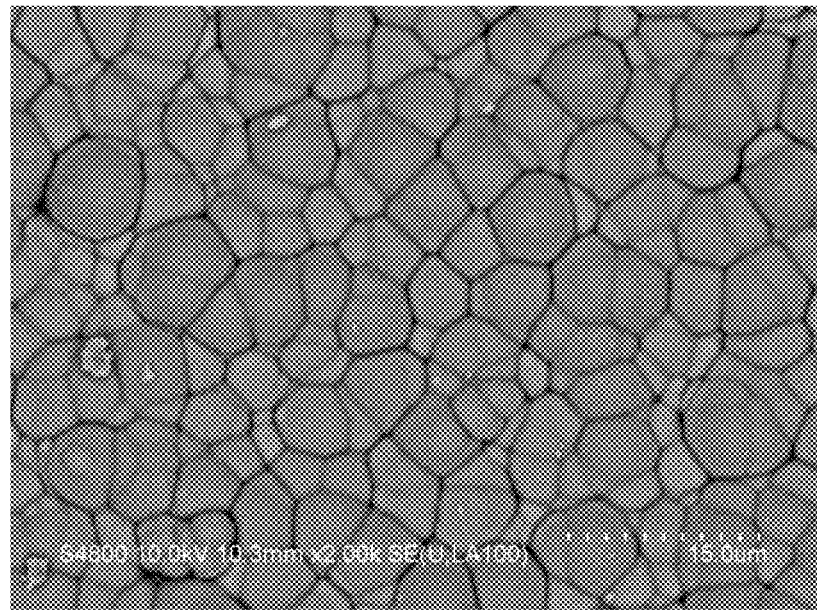
FIGS. 2A and 2B are an SEM image of a surface configuration of the anode illustrated in FIG. 1 and a processed image of the SEM image.
Figure 2B:
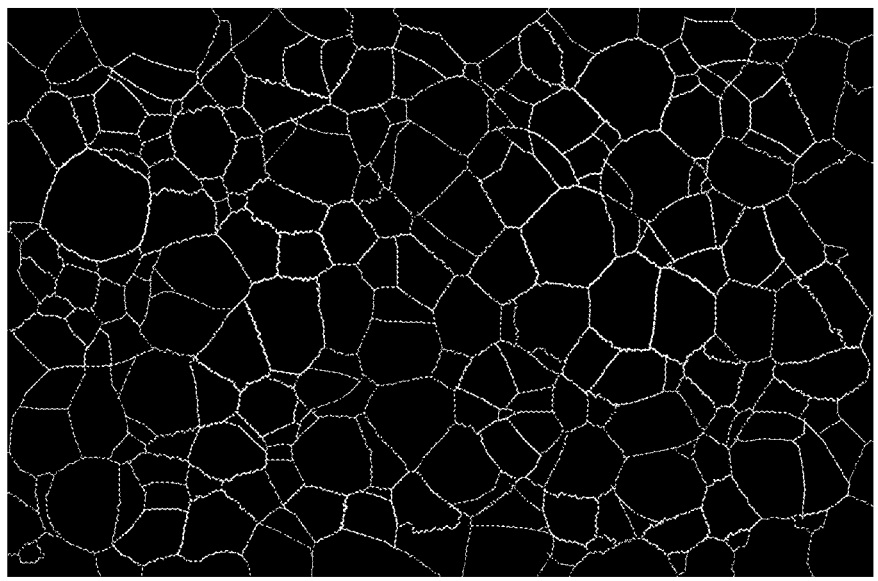

Referring to FIGS. 2A and 2B, a specific configuration of the anode will be described below. FIGS. 2A and 2B illustrate a surface configuration, and FIG. 2A is an SEM image (a secondary electron image), and FIG. 2B is a processed image of the SEM image illustrated in FIG. 2A. FIGS. 2A and 2B illustrate the case where the anode active material has a multilayer configuration, and the anode active material layer 2 is formed by the vapor-phase method (the vacuum evaporation method).

When a surface of the anode (the anode active material layer 2) is observed from a direction where the anode current collector 1 and the anode active material layer 2 are laminated by an SEM at magnifications of 2000, as illustrated in FIG. 2A, a plurality of anode active material particles 200 with various particle diameters are observed. In this case, there are a part where one anode active material particle 200 is clearly separated from other anode active material particles 200 and is singly present and a part where a plurality of anode active material particles 200 (primary particles 201) are gathered as if to be one particle (a secondary particle 202).

When a boundary between the anode active material particles 200 is specified by image processing on the SEM image illustrated in FIG. 2A, as illustrated in FIG. 2B, the contour of each anode active material particle 200 is made clear. Thereby, the existing region (occupancy range) of each anode active material particle 200 is accurately recognized, so the number of anode active material particles 200 is countable, and the particle area of each anode active material particle 200 is calculable.

The average particle area of a plurality of anode active material particles 200 observed from the surface of the anode (the anode active material layer 2) is within a range of 1 $\mu m^2$ to 60 $\mu m^2$ both inclusive. The particle diameter distribution of the plurality of anode active material particles 200 is correctly adjusted, so an internal stress associated with swelling and shrinkage of the anode active material layer 2 during electrode reaction is distributed, and the shape stability of the whole anode is maintained. Thereby, in the case where the anode is used in a secondary battery, superior cycle characteristics are obtained. The above-described average particle area is calculated from a plurality of anode active material particles 200 included in a predetermined observation area (42 $\mu m$ long and 64 $\mu m$ wide) on the basis of an image on which image processing is performed (hereinafter simply referred to as "processed image") illustrated in FIG. 2B.

More specifically, when the average particle area is smaller than 1 $\mu m^2$, the total surface area of the anode active material particles 200 is increased. Thereby, in the case where the anode is used with an electrolyte in an electrochemical device, the anode active material particles 200 react with the electrolyte, thereby to form an irreversible reaction coating such as an SEI (Solid Electrolyte Interphase) easily, so electrical performance of the electrochemical device (for example, a battery capacity in the secondary battery) may decline. On the other hand, when the average particle area is larger than 60 $\mu m^2$, an area in contact with the electrolyte is reduced, so the entry and exit of the electrode reactant may be uneven in the anode active material particles 200, and the anode active material layer 2 may be broken or slipped.

The average particle area is preferably within a range of 2 $\mu m^2$ to 40 $\mu m^2$ both inclusive, and more preferably within a range of 5 $\mu m^2$ to 17 $\mu m^2$ both inclusive, because the possibility that the performance of the above-described electrochemical device declines is further reduced, so a higher effect is obtained.

In the case where among the plurality of anode active material particles 200, an anode active material particle of which the whole image (the whole contour of one anode active material particle 200) is not included in the above-described observation area, and of which only a part is included in the above-described observation area is present, the particle area is calculated without including the anode active material particle.

In particular, the ratio (area ratio) of the total sum of the particle areas of anode active material particles 200 having a particle area of 20 $\mu m^2$ to 30 $\mu m^2$ both inclusive to the total sum of the particle areas of the plurality of the anode active material particles 200 is preferably within a range of 10% to 60% both inclusive, because a balance between an occupancy ratio of anode active material particles 200 having a particle area of 20 $\mu m^2$ to 30 $\mu m^2$ both inclusive which contribute to the attainment of the above-described shape stability of the whole anode and an occupancy ratio of other anode active material particles in the plurality of anode active material particles 200 is correctly adjusted, so a higher effect is obtained. The area ratio is represented by the area ratio (%)=(the total sum of the particle areas of the anode active material particles 200 having a particle area of 20 $\mu m^2$ to 30 $\mu m^2$ both inclusive/the total sum of the particle areas of the plurality of the anode active material particles 200)×100. The area ratio is a value calculated on the basis of the processed image in the predetermined observation area as in the case of the above-described average particle area.

Moreover, the average circularity of the plurality of the anode active material particle 200 is preferably 0.4 or over, and more preferably within a range from 0.4 to 0.8 both inclusive. When the average circularity is smaller than 0.4, the contour of each of the anode active material particles 200 is deviated from a perfect circle, so it is difficult for the anode active material layer 2 to be swelled and shrunk smoothly during electrode reaction. The average circularity is a value calculated on the basis of the processed image in the predetermined observation area as in the case of the above-described average particle area (assuming that a perfect circle is 1.0). The average circularity tends to be a larger value with a decrease in magnification under SEM observation, so as described above, the average circularity specified herein is a value calculated on the basis of the SEM image observed at magnifications of 2000.

To perform the above-described image processing, arbitrary software (image processing software) may be used. As the image processing software, for example, software having a function of automatically executing the above-described image processing on the basis of an SEM image is used. When such automatic execution type image processing software is used, a man-caused error or the like is not included, so a processed image which is uniform and superior in reproducibility is obtained. In particular, as image processing software, software having a function of calculating an average particle area (including a function of calculating a particle area) is preferable, because the average particle area is calculable with high precision. In this case, the software preferably has a function of calculating an area ratio and average circularity in addition to the average particle area, because the average particle area, the area ratio and the average circularity (hereinafter simply referred to "average particle area or the like") is calculable with high precision through the use of one kind of image processing software.

When the image processing is performed, in the case where a boundary between the anode active material particles 200 is not recognized by the processing by the image processing software, the boundary may be manually recognized. More specifically, in the case where in spite of the presence of a visually recognized boundary in the SEM image, the boundary is not included in the processed image, a process (a correction process) of adding (writing) the boundary to the processed image may be performed to incorporate the boundary into the processed image, because when such a correction process is performed, the average particle area or the like is calculable with higher precision.

Moreover, in the case where a foreign matter (such as dust) obviously exists in the SEM image, and there is a possibility that the foreign matter affects the precision or the like of image processing, a process (a correction process) of removing the foreign matter from the processed image may be manually performed, because when such a correction process is performed, the precision for calculating the average particle area or the like may be improved.

Further, when the average particle area or the like is calculated in the predetermined observation area (42 μm long and 64 μm wide), in the case where there is a possibility that an error in the average particle area or the like is observed depending on a position determined as the observation area, it is preferable that the average particle area is calculated in a plurality of observation areas by changing the field of view, and then the average value of the calculated values is determined, because when such an averaging process is performed, the average particle area or the like is calculable with high precision. The number of times when the field of view is changed is arbitrarily set.

In FIGS. 2A and 2B, the case where the vapor-phase method is used as an example of the method of forming the anode active material layer 2 is described; however, even in the case where any other forming method such as the liquid-phase method, the sintering method or the spraying method is used, a plurality of anode active material particles may be observed through the use of the SEM. Therefore, even in the case where the other forming method is used, the average particle area or the like is calculable by undergoing the same steps as those in the case described referring to FIGS. 2A and 2B.

The anode is manufactured by, for example, the following steps.

Figure 3:
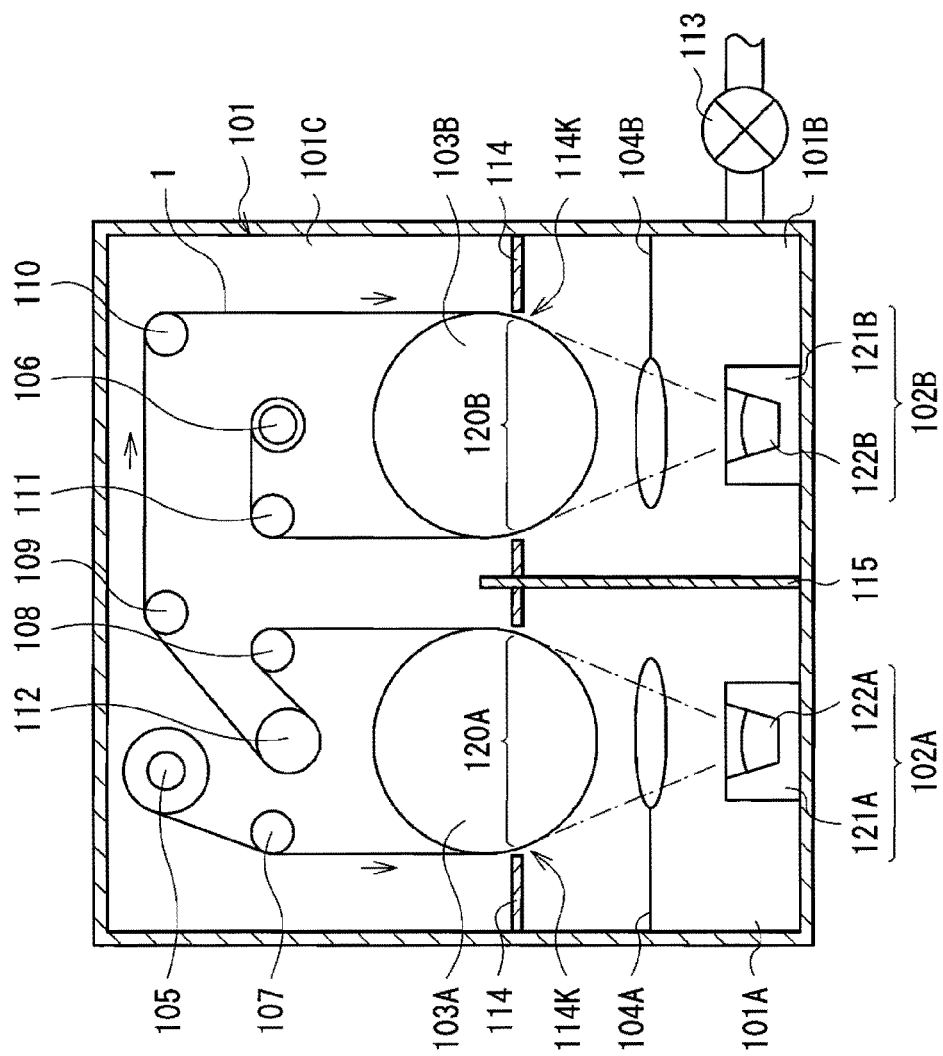
FIG. 3 is a sectional view of a schematic configuration example of a manufacturing apparatus for manufacturing the anode according to the embodiment of the invention.

FIG. 3 illustrates a schematic configuration example of a manufacturing apparatus (an evaporation apparatus) used for manufacturing the anode. The evaporation apparatus forms the anode active material layer 2 on a surface of the anode current collector 1 by, for example, an electron beam evaporation method.

More specifically, the evaporation apparatus includes evaporation sources 102A and 102B (crucibles 121A and 121B and evaporation materials 122A and 122B), can rolls (film-formation rolls) 103A and 103B, shutters 104A and 104B, wind-up rollers 105 and 106, guide rollers 107 to 111, and a feed roller 112 in an evaporation bath 101. A vacuum evacuation apparatus 113 is arranged outside of the evaporation bath 2.

The evaporation bath 101 is separated into evaporation source rooms 101A and 101B and an evaporation object transport room 101C by a divider 114 having two openings 114K. The evaporation source rooms 101A and 101B are separated by a wall 115. Portions 120A and 120B entering the evaporation source rooms 101A and 101B of outer surfaces of the can rolls 103A and 103B are regions where the evaporation materials 122A and 122B are deposited, respectively.

The evaporation sources 102A and 102B include, for example, an electron gun (not illustrated), and the evaporation materials 122A and 122B as anode materials are heated to evaporation (vaporization). For example, a cooling system such as a water jacket may be added to the crucibles 121A and 121B.

The anode current collector 1 as the evaporation object has, for example, a strip-shaped continuous configuration. In the anode current collector 1, for example, an end is wound by the wind-up roller 105, and the other end is wound by the wind-up roller 106. Thereby, the anode current collector 1 is transported from the wind-up roller 105 to the wind-up roller 106 through the guide roller 107, the can roll 103A, the guide roller 108, the feed roller 112, the guide rollers 109 and 110, the can roll 103B and the guide roller 111 in this order, and then the anode current collector 1 is wound by the wind-up roller 106.

When the anode is manufactured by the evaporation apparatus, while the anode current collector 1 is transported, the evaporation materials 122A and 122B contained in the crucibles 121A and 121B are evaporated to be deposited on the surfaces of the anode current collector 1, thereby the anode active material layer 2 is formed. In this case, in a step of transporting the anode current collector 1, the evaporation material 122A evaporated from the crucible 121A is deposited on one surface (a front surface) of the anode current collector 1, and the evaporation material 122B evaporated from the crucible 121B is deposited on the other surface (a back surface) of the anode current collector 1. Thereby, the anode active material layer 2 is formed on both surfaces of the anode current collector 1 by performing the step of transporting only once.

In the case where the anode active material layer 2 is formed, the anode current collector 1 may be transported only in one direction so that the anode active material layer 2 has a single-layer configuration, or the anode current collector 1 may be reciprocated bidirectionally so that the anode active material layer 2 has a multilayer configuration. In this case, conditions such as the transport speed of the anode current collector 1 and the formation speed of the anode active material layer 2 (the deposition speeds of the evaporation materials 122A and 122B) are arbitrarily adjustable.

In this description, the evaporation apparatus including two evaporation source rooms 101A and 101B is used; however, the evaporation apparatus is not limited thereto, and an evaporation apparatus including one evaporation source room may be used.

In the case where the anode is manufactured, the average particle areas or the like of the above-described plurality of anode active material particles may be changed by adjusting manufacturing conditions.

Examples of conditions for forming the anode active material layer 2 having a single-layer configuration include the surface roughness (for example, ten-point average roughness R) of the anode current collector 1, the deposition speed of the anode material and the like. In addition, if necessary, a gas (for example, an argon (Ar) gas or the like) may be introduced during deposition of the anode material, and the introduced amount may be adjusted.

Examples of conditions for forming the anode active material layer 2 having a multilayer configuration by an apparatus capable of transporting the anode current collector 1 as illustrated in FIG. 3 include the transport speed of the anode current collector 1, the number of layers of the anode active material layer 2 and the like in addition to the conditions described in the case where the anode active material layer 2 having a single-layer configuration is formed.

According to the anode, the average particle area of the plurality of anode active material particles observed from the surface of the anode active material layer 2 is within a range of 1 μm$^2$ to 60 μm$^2$ both inclusive, so an internal stress associated with swelling of the anode active material layer 2 during electrode reaction is distributed, thereby to maintain the shape stability of the whole anode. Therefore, when the electrochemical device uses the anode, the anode may contribute to an improvement in the performance of the electrochemical device. More specifically, in the case where the anode is used in the secondary battery, the anode may contribute to an improvement in cycle characteristics. In this case, when the average particle area of the plurality of anode active material particles is within a range of 2 μm² to 40 μm² both inclusive, more specifically within a range from 5 μm² to 17 μm² both inclusive, a higher effect may be obtained.

Moreover, the ratio (area ratio) of the total sum of the particle areas of the anode active material particles 200 having a particle area of 20 μm² to 30 μm² both inclusive to the total sum of the particle areas of the plurality of anode active material particles 200 is within a range of 10% to 60% both inclusive, or when the average circularity of the plurality of anode active material particles in the observation area is within a range of 0.4 to 0.8 both inclusive, a higher effect may be obtained.

Further, when the anode active material particles include at least one kind selected from the group consisting of the simple substance, alloys and compounds of silicon, the anode active material layer 2 tends to be swelled and shrunk easily during electrode reaction. Therefore, an internal stress associated with swelling and shrinkage of the anode active material layer 2 is effectively reduced, so a higher effect may be obtained.

Next, application examples of the above-described anode will be described below. As an example of the electrochemical device, a secondary battery is used, and the anode is used in the secondary battery as below.

First Secondary Battery

Figure 4:
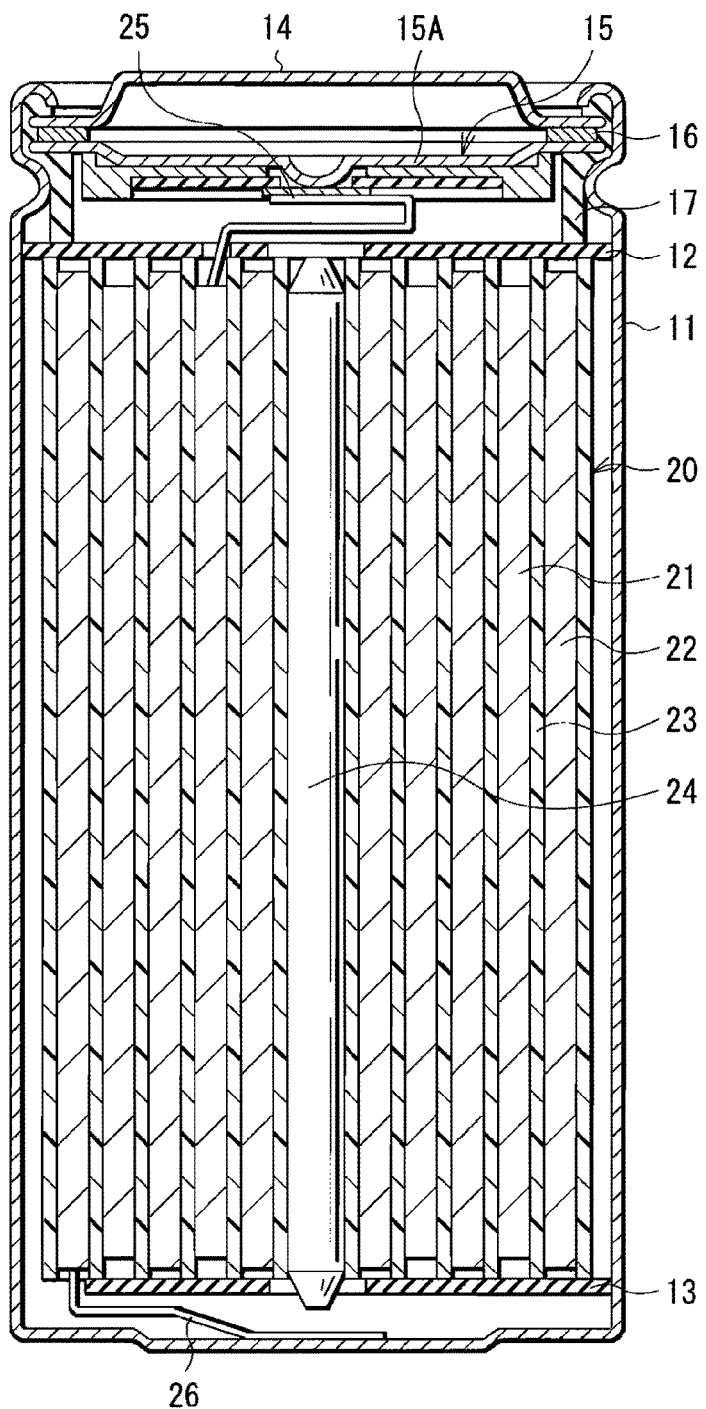
FIG. 4 is a sectional view of a configuration of a first secondary battery using the anode according to the embodiment of the invention.
Figure 5:
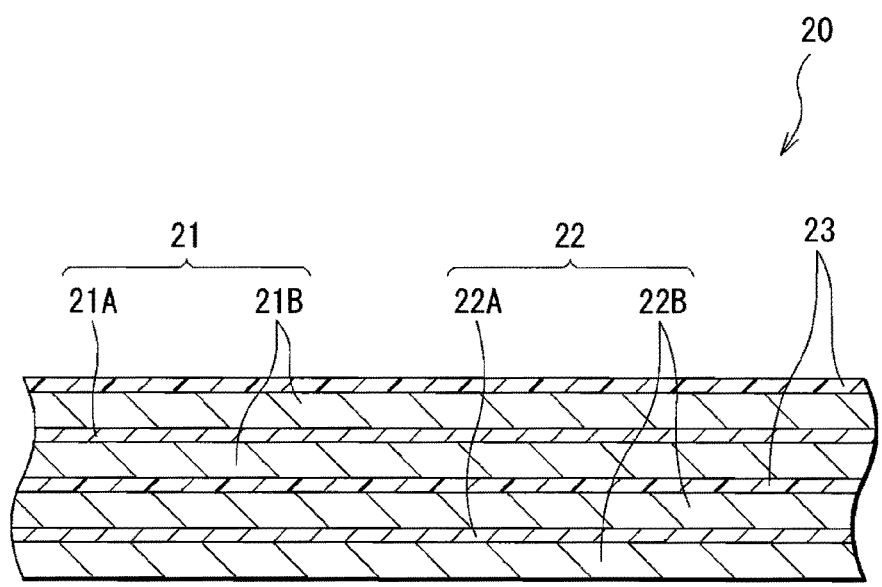
FIG. 5 is an enlarged sectional view of a part of a spirally wound electrode body illustrated in FIG. 4.

FIGS. 4 and 5 illustrate sectional views of a first secondary battery, and FIG. 5 illustrates an enlarged view of a part of a spirally wound electrode body 20 illustrated in FIG. 4. The secondary battery described herein is a lithium-ion secondary battery in which the capacity of an anode 22 is represented on the basis of insertion and extraction of lithium as an electrode reactant.

The first secondary battery mainly includes a spirally wound electrode body 20 which includes a cathode 21 and an anode 22 spirally wound with a separator 23 in between and a pair of insulating plates 12 and 13 in a substantially hollow cylindrical-shaped battery can 11. The battery configuration using the cylindrical-shaped battery can 11 is called a cylindrical type.

The battery can 11 has a hollow configuration in which an end of the battery can 11 is closed, and the other end thereof is opened, and the battery can 11 is made of a metal material such as iron, aluminum, an alloy thereof or stainless. In the case where the battery can 11 is made of iron, for example, the battery can 11 may be plated with, for example, nickel or the like. The pair of insulating plates 12 and 13 are arranged so that the spirally wound electrode body 20 is sandwiched therebetween, and the pair of insulating plates 12 and 13 extend in a direction perpendicular to a peripheral winding surface.

In the open end of the battery can 11, a battery cover 14, and a safety valve mechanism 15 and a positive temperature coefficient device (PTC device) 16 arranged inside the battery cover 14 are mounted by caulking by a gasket 17. Thereby, the interior of the battery can 11 is sealed. The battery cover 14 is made of, for example, the same metal material as that of the battery can 11. The safety valve mechanism 15 is electrically connected to the battery cover 14 through the PTC device 16. In the safety valve mechanism 15, when an internal pressure in the battery increases to a certain extent or higher due to an internal short circuit or external application of heat, a disk plate 15A is flipped so as to disconnect the electrical connection between the battery cover 14 and the spirally wound electrode body 20. When a temperature rises, the PTC device 16 limits a current by an increased resistance to prevent abnormal heat generation caused by a large current. The gasket 17 is made of, for example, an insulating material, and its surface is coated with asphalt.

A center pin 24 may be inserted into the center of the spirally wound electrode body 20. In the spirally wound electrode body 20, a cathode lead 25 made of a metal material such as aluminum is connected to the cathode 21, and an anode lead 26 made of a metal material such as nickel is connected to the anode 22. The cathode lead 25 is electrically connected to the battery cover 14 by welding or the like of the cathode lead 25 to the safety valve mechanism 15, and the anode lead 26 is electrically connected to the battery can 11 by welding or the like of the anode lead 26 to the battery can 11.

The cathode 21 is formed by arranging a cathode active material layer 21B on both surfaces of a cathode current collector 21A having a pair of surfaces. The cathode active material layer 21B may be formed on only one surface of the cathode current collector 21A.

The cathode current collector 21A is made of, for example, a metal material such as aluminum, nickel or stainless.

The cathode active material layer 21B includes one kind or two or more kinds of cathode materials capable of inserting and extracting lithium as a cathode active material, and the cathode active material layer 21B may include any other material such as a cathode binder or cathode conductor, if necessary.

As the cathode material capable of inserting and extracting lithium, for example, a lithium-containing compound is preferable, because a high energy density is obtained. Examples of the lithium-containing compound include a complex oxide including lithium and a transition metal element or a phosphate compound including lithium and a transition metal element. Among them, a lithium-containing compound including at least one kind selected from the group consisting of cobalt, nickel, manganese and iron as the transition metal element is preferable, because a higher voltage is obtained. The complex oxide or the phosphate compound is represented by, for example, $Li_xM1O_2$ or $Li_yM2PO_4$. In the chemical formula, M1 and M2 each represent one or more kinds of transition metal elements. The values of x and y depend on a charge-discharge state of the battery, and are generally within a range of $0.05 \le x \le 1.10$ and $0.05 \le y \le 1.10$, respectively.

Examples of the complex oxide including lithium and a transition metal element include lithium-cobalt complex oxide ($Li_xCoO_2$), lithium-nickel complex oxide ($Li_xNiO_2$), lithium-nickel-cobalt complex oxide ($Li_xNi_{1-z}Co_zO_2$ (z<1)), lithium-nickel-cobalt-manganese complex oxide ($Li_xNi_{(1-v-w)}Co_vMn_wO_2$ (v+w<1)), lithium-manganese complex oxide ($LiMn_2O_4$) having a spinel structure and the like. Among them, a complex oxide including cobalt is preferable, because a high capacity is obtained, and superior cycle characteristics are obtained. Examples of the phosphate compound including lithium and a transition metal element include a lithium-iron phosphate compound ($LiFePO_4$), a lithium-iron-manganese phosphate compound ($LiFe_{1-u}Mn_uPO_4$ (u<1)) and the like.

In addition to the above-described materials, examples of the cathode material capable of inserting and extracting lithium include an oxide such as titanium oxide, vanadium oxide or manganese dioxide, a bisulfide such as titanium bisulfide or molybdenum sulfide, a chalcogenide such as niobium selenide, sulfur, and a conductive polymer such as polyaniline or polythiophene.

The cathode material capable of inserting and extracting lithium may be any material except for the above-described materials. A mixture of two or more kinds arbitrarily selected from the above-described cathode materials may be used.

Examples of the cathode binder include synthetic rubber such as styrene butadiene-based rubber, fluorine-based rubber or ethylene propylene diene and a polymer material such as polyvinylidene fluoride. Only one kind or a mixture of a plurality of kinds selected from them may be used.

Examples of the cathode conductor include the same materials as those of the above-described anode conductor.

The anode 22 has the same configuration as that of the above-described anode, and is formed by arranging an anode active material layer 22B on both surfaces of an anode current collector 22A having a pair of surfaces. The configurations of the anode current collector 22A and the anode active material layer 22B are the same as those of the anode current collector 1 and the anode active material layer 2, respectively. In the anode 22, a chargeable capacity in the anode material capable of inserting and extracting lithium is preferably larger than the discharge capacity of the cathode.

Figure 6:
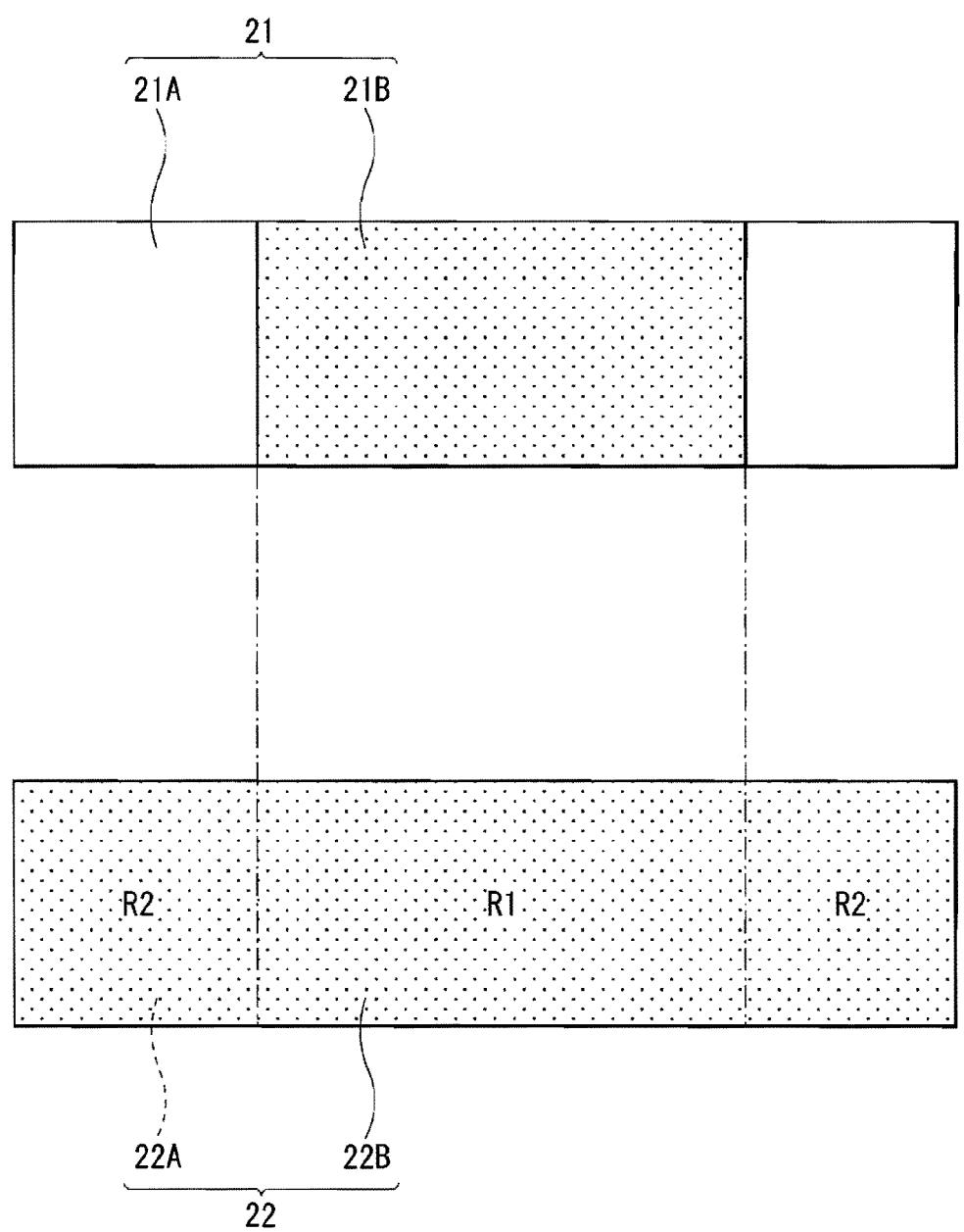
FIG. 6 is a plan view of configurations of a cathode and the anode illustrated in FIG. 5.

FIG. 6 illustrates plan configurations of the cathode 21 and the anode 22 illustrated in FIG. 5. In FIG. 6, an area where the cathode active material layer 21B is formed in the cathode 21 is shaded, and an area where the anode active material layer 22B is formed in the anode 22 is shaded.

In the secondary battery, while, for example, the cathode active material layer 21B is arranged in a part (for example, a central region in a longitudinal direction) of a surface of the cathode current collector 21A, the anode active material layer 22B is arranged on the whole surface of the anode current collector 22A. In other words, the anode active material layer 22B is arranged in a region R1 facing the cathode active material layer 21B and a region R2 not facing the cathode active material layer 21B on the anode current collector 22A.

In this case, only a portion arranged in the region R1 of the anode active material layer 22B contributes to charge-discharge reaction, and a portion arranged in the region R2 of the anode active material layer 22B does not contribute to charge-discharge reaction. Thereby, in the portion arranged in the region R2, the state of the anode active material layer 22B (such as the particle diameter distribution of a plurality of anode active material particles) is not changed by the charge-discharge reaction, so a state (an initial state) after manufacturing the anode 22 is maintained without change. Therefore, in the case where the average particle area or the like of the above-described plurality of anode active material particles is calculated, the average particle area or the like in the anode active material layer 22B arranged in the region R2 is preferably calculated, because the average particle area or the like is calculable with good reproducibility independent of the history of charge and discharge.

The separator 23 isolates between the cathode 21 and the anode 22 so that lithium ions pass therethrough while preventing a short circuit of a current due to contact between the cathode 21 and the anode 22. The separator 23 is made of, for example, a porous film of a synthetic resin such as polytetrafluoroethylene, polypropylene or polyethylene, a porous film of ceramic, or the like, and the separator 23 may have a configuration in which two or more kinds of the porous films are laminated.

The separator 23 is impregnated with an electrolyte. The separator 23 may play a primary role as the separator as well as a role as the electrolyte (that is, the separator 23 may include ionic conductivity but not include electronic conductivity).

A solvent included in the electrolyte includes, for example, one kind or two or more kinds of nonaqueous solvents such as organic solvents, and specific examples of the nonaqueous solvents include the following solvents. The solvents which will be described below may be arbitrarily combined.

Examples of the nonaqueous solvents include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, dimethyl sulfoxide and the like, because a superior battery capacity, superior cycle characteristics, superior storage characteristics and the like are obtained. Among them, at least one kind selected from the group consisting of ethylene carbonate, propylene carbonate, γ-butyrolactone, dimethyl carbonate, diethyl carbonate and ethyl methyl carbonate is preferable. In this case, the solvent preferably includes a combination of a high-viscosity (high-permittivity) solvent (for example, relative permittivity $\epsilon \geq 30$) such as ethylene carbonate or propylene carbonate and a low-viscosity solvent (for example, viscosity$\leq 1$ mPa·s) such as dimethyl carbonate, ethyl methyl carbonate or diethyl carbonate is more preferable, because the dissociation property of an electrolyte salt and ion mobility are improved.

In particular, the solvent preferably includes one kind or two or more kinds of halogenated carbonates, because a stable protective film is formed on a surface of the anode 22 during charge and discharge, so decomposition reaction of the electrolyte is prevented. The halogenated carbonates include chain carbonates including a halogen as a constituent element and cyclic carbonates including a halogen as a constituent element. Examples of the chain carbonates include fluoromethyl methyl carbonate, bis(fluoromethyl) carbonate, difluoromethyl methyl carbonate and the like, and examples of the cyclic carbonates include cyclic compounds such as 4-fluoro-1,3-dioxolane-2-one and 4,5-difluoro-1,3-dioxolane-2-one. Any compounds other than the above-described compounds may be used as long as the compounds correspond to the chain carbonate including a halogen as a constituent element or the cyclic carbonate including a halogen as a constituent element.

Moreover, the solvent preferably includes one kind or two or more kinds of cyclic carbonates having an unsaturated bond, because chemical stability of the electrolyte is further improved. Examples of the cyclic carbonates having an unsaturated bond include vinylene carbonate, vinyl ethylene carbonate and the like. Any compounds other than the above-described compounds may be used as long as the compounds correspond to the cyclic carbonate having an unsaturated bond.

In addition, the solvent may include a sultone (a cyclic sulfonate) or an acid anhydride, because chemical stability of the electrolyte is further improved. Examples of the sultone include propane sultone, propene sultone and the like. Examples of the acid anhydride include a carboxylic anhydride such as succinic anhydride, glutaric anhydride or maleic anhydride, a disulfonic anhydride such as ethanedisulfonic anhydride or propanedisulfonic anhydride, an anhydride of a carboxylic acid and a sulfonic acid such as sulfobenzoic anhydride, sulfopropionic anhydride or sulfobutyric anhydride, and the like.

The electrolyte salt included in the electrolyte includes, for example, one kind or two or more kinds of light metal salts such as lithium salts, and specific examples of the lithium salts include the following salts. The lithium salts which will be described below may be arbitrarily combined.

Examples of the lithium salts include lithium hexafluorophosphate, lithium tetrafluoroborate, lithium perchlorate, lithium hexafluoroarsenate, lithium tetraphenyl borate (LiB$(C_6H_5)_4$), lithium methanesulfonate (LiCH$_3$SO$_3$), lithium trifluoromethanesulfonate (LiCF$_3$SO$_3$), lithium tetrachloroaluminate (LiAlCl$_4$), lithium hexafluorosilicate (Li$_2$SiF$_6$), lithium chloride (LiCl), lithium bromide (LiBr) and the like, because a superior battery capacity, superior cycle characteristics and superior storage characteristics are obtained. Among them, at least one kind selected from the group consisting of lithium hexafluorophosphate, lithium tetrafluoroborate, lithium perchlorate and lithium hexafluoroarsenate is preferable, and lithium hexafluorophosphate is more preferable, because internal resistance declines, thereby a higher effect is obtained.

The content of the electrolyte salt is preferably within a range of 0.3 mol/kg to 3.0 mol/kg both inclusive relative to the solvent, because when the content of the electrolyte salt is out of the range, ionic conductivity may be extremely reduced.

The secondary battery is manufactured by the following steps, for example.

First, the cathode 21 is formed. The cathode active material, the binder and the conductor are mixed to form a cathode mixture, and then the cathode mixture is dispersed in an organic solvent to form paste-form cathode mixture slurry. Next, the cathode mixture slurry is uniformly applied to both surfaces of the cathode current collector 21A by a doctor blade, a bar coater or the like, and then the cathode mixture slurry is dried. Finally, a coating of the cathode mixture slurry is compression molded by a roller press or the like on heating, if necessary to form the cathode active material layer 21B. In this case, compression molding may be repeated a plurality of times.

Next, the anode active material layer 22B is formed on both surfaces of the anode current collector 22A by the same steps as those in the above-described steps of forming the anode to form the anode 22.

The secondary battery is assembled by the following steps. First, the cathode lead 25 is attached to the cathode current collector 21A by welding or the like, and the anode lead 26 is attached to the anode current collector 22A by welding or the like. Next, the cathode 21 and the anode 22 are laminated with the separator 23 in between, and are wound to form the spirally wound electrode body 20, and then the center pin 24 is inserted into the center of the spirally wound electrode body 20. Next, the spirally wound electrode body 20 sandwiched between the pair of insulating plates 12 and 13 is contained in the battery can 11, and an end of the cathode lead 25 is welded to the safety valve mechanism 15, and an end of the anode lead 26 is welded to the battery can 11. Then, the electrolyte is injected into the battery can 11, and the separator 23 is impregnated with the electrolyte. Finally, the battery cover 14, the safety valve mechanism 15 and the PTC device 16 are fixed in an open end of the battery can 11 by caulking by the gasket 17. Thereby, the secondary battery illustrated in FIGS. 4 to 6 is completed.

When the secondary battery is charged, lithium ions are extracted from the cathode 21, and the lithium ions are inserted into the anode 22 through the electrolyte with which the separator 23 is impregnated. On the other hand, when the secondary battery is discharged, for example, lithium ions are extracted from the anode 22, and the lithium ions are inserted into the cathode 21 through the electrolyte with which the separator 23 is impregnated.

In the cylindrical type secondary battery, the anode 22 has the same configuration as that of the above described anode, so the cycle characteristics are improved. Other effects of the secondary battery are the same as those in the above-described anode.

Second Secondary Battery

Figure 7:
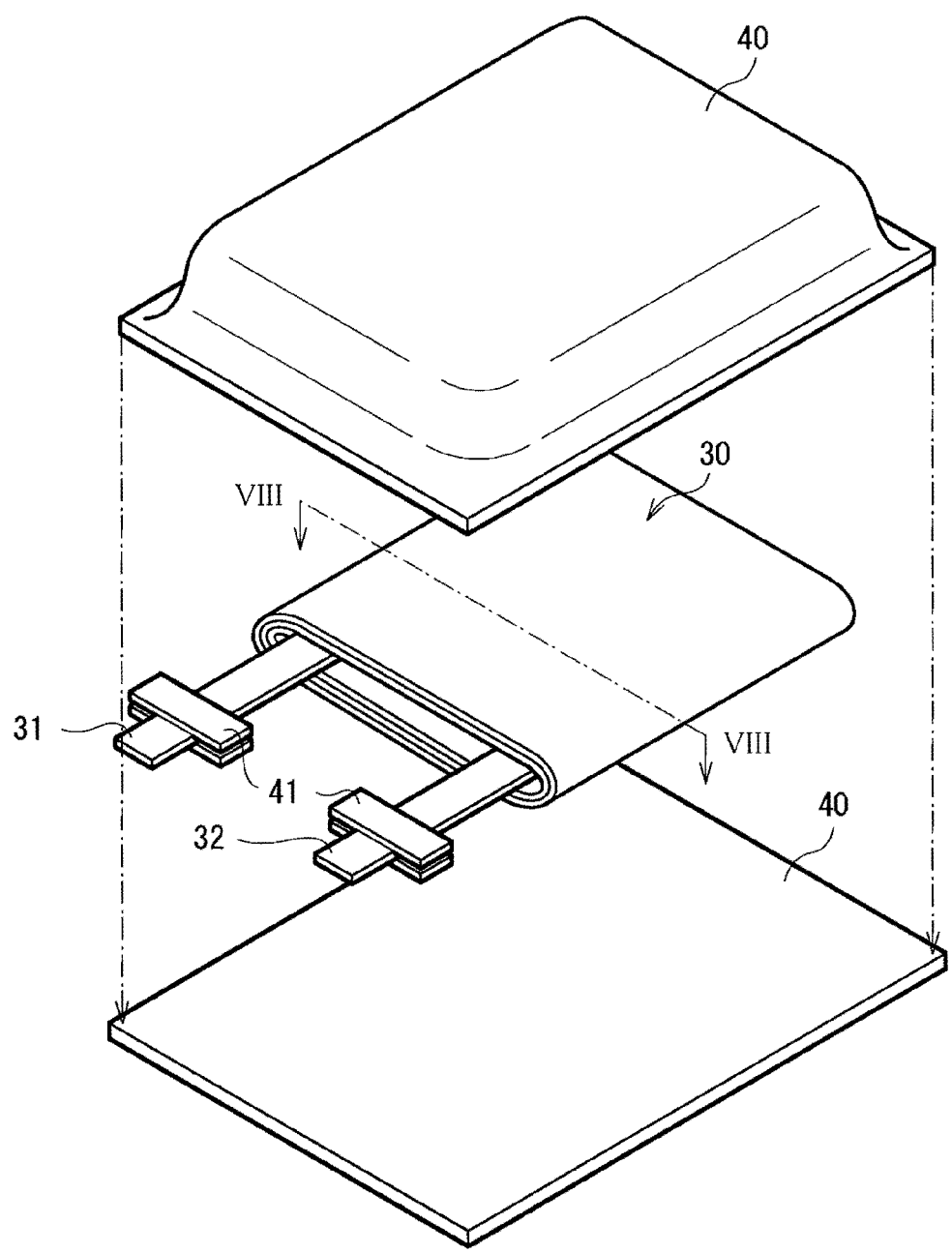
FIG. 7 is a sectional view of a configuration of a second secondary battery using the anode according to the embodiment of the invention.
Figure 8:
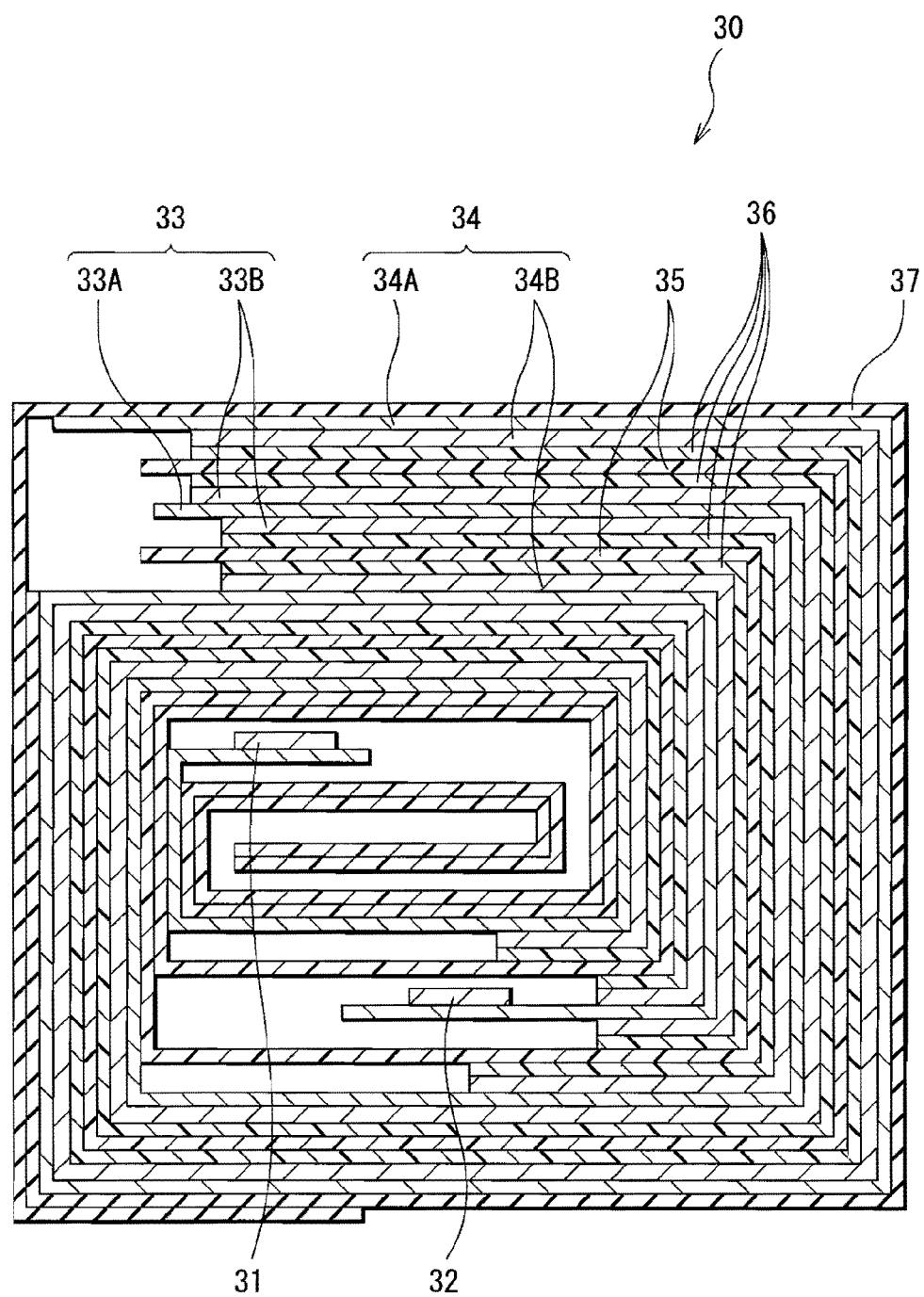
FIG. 8 is a sectional view of a spirally wound electrode body taken along a line VIII-VIII of FIG. 7.

FIG. 7 is an exploded perspective view of a second secondary battery, and FIG. 8 is an enlarged sectional view taken along a line VIII-VIII of a spirally wound electrode body 30 illustrated in FIG. 7.

The second secondary battery is, for example, a lithium-ion secondary battery as in the case of the first secondary battery. In the secondary battery, mainly the spirally wound electrode body 30 to which a cathode lead 31 and an anode lead 32 are attached is contained in film-shaped package members 40. The battery configuration using the film-shaped package members 40 is called a laminate film type.

The cathode lead 31 and the anode lead 32 are drawn, for example, from the interiors of the package members 40 to outside in the same direction. The cathode lead 31 is made of, for example, a metal material such as aluminum, and the anode lead 32 is made of, for example, a metal material such as copper, nickel or stainless. The metal materials of which the cathode lead 31 and the anode lead 32 are made each have a sheet shape or a mesh shape.

The package members 40 are made of, for example, an aluminum laminate film including a nylon film, aluminum foil and a polyethylene film which are bonded in this order. The package members 40 have a configuration in which edge portions of two rectangular aluminum laminate films are adhered to each other by fusion bonding or an adhesive so that the polyethylene film of each of the rectangular aluminum laminate films faces the spirally wound electrode body 30.

An adhesive film 41 is inserted between the package members 40 and the cathode lead 31 and the anode lead 32 for preventing the entry of outside air. The adhesive film 41 is made of, for example, a material having adhesion to the cathode lead 31 and the anode lead 32. Examples of such a material include polyolefin resins such as polyethylene, polypropylene, modified polyethylene and modified polypropylene.

In addition, the package members 40 may be made of a laminate film with any other configuration, a polymer film such as polypropylene or a metal film instead of the above-described three-layer aluminum laminate film.

The spirally wound electrode body 30 is formed by laminating and spirally winding the cathode 33 and the anode 34 with the separator 35 and an electrolyte 36 in between, and an outermost portion of the spirally wound electrode body 30 is protected with a protective tape 37.

The cathode 33 is formed by arranging a cathode active material layer 33B on both surfaces of a cathode current collector 33A. The anode 34 has, for example, the same configuration as that of the above-described anode, and is formed by arranging an anode active material layer 34B on both surfaces of an anode current collector 34A. The configurations of the cathode current collector 33A, the cathode active material layer 33B, the anode current collector 34A, the anode active material layer 34B and the separator 35 are the same as those of the cathode current collector 21A, the cathode active material layer 21B, the anode current collector 22A, the anode active material layer 22B and the separator 23, respectively.

The electrolyte 36 includes the above-described solvent, the above-described electrolyte salt and a polymer compound holding them, and is a so-called gel electrolyte. The gel electrolyte 36 is preferable, because the gel electrolyte 36 is capable of obtaining high ionic conductivity (for example, 1 mS/cm or over at room temperature), and liquid leakage from the battery is prevented.

The kinds of the solvent and the electrolyte salt are the same as those in the case where the first secondary battery is described.

Examples of the polymer compound include polyacrylonitrile, polyvinylidene fluoride, a copolymer of polyvinylidene fluoride and polyhexafluoropyrene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acids, polymethacrylic acids, styrene-butadiene rubber, nitrile-butadiene rubber, polystyrene, polycarbonate and the like. Only one kind or a mixture of a plurality of kinds selected from them may be used. Among them, polyacrylonitrile, polyvinylidene fluoride, polyhexafluoropropylene or polyethylene oxide is preferable, because they are electrochemically stable.

However, the solvent in the gel electrolyte 36 means a wide concept including not only a liquid solvent but also a solvent having ionic conductivity capable of dissociating the electrolyte salt. Therefore, in the case where a polymer compound having ionic conductivity is used, the polymer compound is included in the concept of the solvent.

Instead of the gel electrolyte 36, the solvent and the electrolyte salt may be used as it is, and the separator 35 may be impregnated with them.

The secondary battery may be manufactured by the following three kinds of manufacturing methods, for example.

In a first manufacturing method, first, by the same steps as those in the above-described steps of forming the cathode 21 and the anode 22 in the first secondary battery, the cathode active material layer 33B is formed on both surfaces of the cathode current collector 33A so as to form the cathode 33, and the anode active material layer 34B is formed on both surfaces of the anode current collector 34A so as to form the anode 34. Next, the gel electrolyte 36 is formed by preparing a precursor solution including the solvent and the electrolyte salt, the polymer compound and a solvent, applying the precursor solution to the cathode 33 and the anode 34, and volatilizing the solvent. Next, the cathode lead 31 and the anode lead 32 are welded to the cathode current collector 33A and the anode current collector 34A, respectively. Next, the cathode 33 on which the electrolyte 36 is formed and the anode 34 on which the electrolyte 36 is formed are laminated with the separator 35 in between to form a laminate, and the laminate is spirally wound in a longitudinal direction, and then the protective tape 37 is bonded to an outermost portion of the laminate so as to form the spirally wound electrode body 30. Finally, for example, the spirally wound electrode body 30 is sandwiched between two film-shaped package members 40, and edge portions of the package members 40 are adhered to each other by thermal fusion bonding or the like to seal the spirally wound electrode body 30 in the package members 40. In this case, the adhesive film 41 is inserted between the cathode lead 31 and the anode lead 32, and the package members 40. Thereby, the secondary battery illustrated in FIGS. 7 and 8 is completed.

In a second manufacturing method, first, the cathode lead 31 and the anode lead 32 are welded to the cathode 33 and the anode 34, respectively. The cathode 33 and the anode 34 are laminated with the separator 35 in between to form a laminate, and the laminate is spirally wound, and then the protective tape 37 is bonded to an outermost portion of the spirally wound laminate so as to form a spirally wound body as a precursor body of the spirally wound electrode body 30. Next, the spirally wound body is sandwiched between two film-shaped package members 40, and the edge portions of the package members 40 except for edge portions on one side are adhered by thermal fusion bonding or the like to form a pouched package, thereby the spirally wound body is contained in the package members 40. An electrolytic composition which includes the solvent and the electrolyte salt, monomers as materials of a polymer compound and a polymerization initiator and, if necessary, any other material such as a polymerization inhibitor is prepared, and the composition is injected in the package members 40, and then an opened portion of the package members 40 are sealed by thermal fusion bonding or the like. Finally, the monomers are polymerized by applying heat to form the polymer compound, thereby the gel electrolyte 36 is formed. Thus, the secondary battery is completed.

In a third manufacturing method, as in the case of the second manufacturing method, the spirally wound body is formed, and the spirally wound body is contained in the package members 40, except that the separator 35 with both sides coated with a polymer compound is used. Examples of the polymer compound applied to the separator 35 include a polymer including vinylidene fluoride as a component, that is, a homopolymer, a copolymer, a multicomponent copolymer, and the like. More specifically, polyvinylidene fluoride, a binary copolymer including vinylidene fluoride and hexafluoropropylene as components, a ternary copolymer including vinylidene fluoride, hexafluoropropylene and chlorotrifluoroethylene as components, or the like is used. The polymer compound may include one kind or two or more kinds of other polymer compounds in addition to the above-described polymer including vinylidene fluoride as a component. Next, the solvent in which the electrolyte salt is dissolved is injected into the package members 40, and an opened portion of the package members 40 is sealed by thermal fusion bonding or the like. Finally, the package members 40 are heated while being weighted so that the separator 35 is brought into close contact with the cathode 33 and the anode 34 with the polymer compound in between. Thereby, the polymer compound is gelatinized so as to form the electrolyte 36, so the secondary battery is completed.

In the third manufacturing method, compared to the first manufacturing method, swelling of the secondary battery is prevented. Moreover, in the third manufacturing method, compared to the second manufacturing method, monomers as the materials of the polymer compound, the solvent and the like hardly remain in the electrolyte 36, and a step of forming the polymer compound is controlled well, so sufficient adhesion between the cathode 33 and anode 34, and the separator 35 and the electrolyte 36 is obtained.

In the laminate film type secondary battery, the anode 34 has the same configuration as that of the above-described anode, so the cycle characteristics are improved. The functions and effects of the laminate type secondary battery are the same as those in the above-described anode.

Third Secondary Battery

Figure 9:
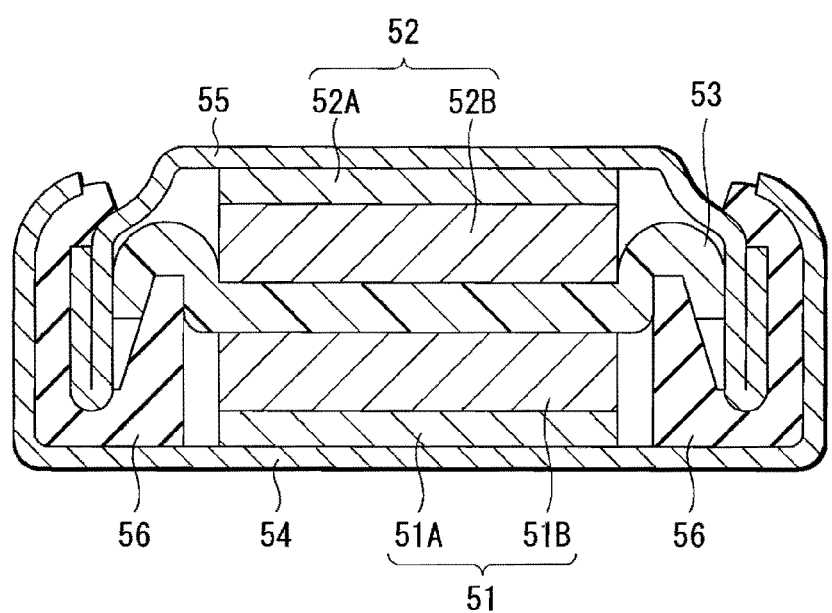
FIG. 9 is a sectional view of a configuration of a third secondary battery using the anode according to the embodiment of the invention.

FIG. 9 illustrates a sectional view of a third secondary battery according to the embodiment of the invention. For example, the third secondary battery is a lithium-ion secondary battery as in the case of the first secondary battery. In the secondary battery, a package can 54 in which a cathode 51 is contained and a package cup 55 in which an anode 52 is contained are laminated with a separator 53 impregnated with the electrolyte in between, and they are caulked by a gasket 56. The battery configuration using the package can 54 and the package cup 55 is a so-called coin type.

The configurations of the package can 54 and the package cup 55, and the gasket 56 are the same as those in the battery can 11 and the gasket 17 in the first secondary battery, respectively.

The cathode 51 is formed by arranging a cathode active material layer 51B on one surface of a cathode current collector 51A. The anode 52 has the same configuration as that of the above-described anode, and is formed, for example, by arranging an anode active material layer 52B on one surface of an anode current collector 52A. The configurations of the cathode current collector 51A, the cathode active material layer 51B, the anode current collector 52A, the anode active material layer 52B, and the separator 53, and a composition of the electrolyte are the same as those of the cathode current collector 21A, the cathode active material layer 21B, the anode current collector 22A, the anode active material layer 22B, and the separator 23, and that of the electrolyte in first secondary battery, respectively.

The secondary battery is manufactured by the following steps, for example.

First, by the same steps as the steps of forming the cathode 21 and anode 22 in the first secondary battery, the cathode active material layer 51B is formed on one surface of the cathode current collector 51A to form the cathode 51, and the anode active material layer 52B is formed on one surface of the anode current collector 52A to form the anode 52. Next, the cathode 51 and the anode 52 are stamped into a pellet with a predetermined diameter. Then, the cathode 51 is contained in the package can 54, and the anode 52 is attached to the package cup 55. Finally, the package can 54 and the package cup 55 are laminated with the separator 53 impregnated with the electrolyte in between, and they are caulked by the gasket 56. At this time, when the thicknesses of the cathode 51 and the anode 52 are short with respect to an interior volume, if necessary, a conducting spacer or the like may be included to bring the cathode 51 and the anode 52 in close contact with each other. Thereby, the coin-type secondary battery illustrated in FIG. 9 is completed.

In the coin-type secondary battery, the anode 52 has the same configuration as that of the above-described anode, so cycle characteristics are improved. Other effects of the secondary battery are the same as those in the above-described anode.

EXAMPLES

Examples of the invention will be described in detail below.

Examples 1-1 to 1-17

Coin-type secondary batteries illustrated in FIG. 9 were manufactured by the following steps. At that time, the coin-type secondary batteries were lithium-ion secondary batteries in which the capacity of the anode 52 was represented on the basis of insertion and extraction of lithium.

First, the cathode 51 was formed. Lithium carbonate ($Li_2CO_3$) and cobalt carbonate ($CoCO_3$) were mixed at a molar ratio of 0.5:1 to form a mixture, and the mixture was fired in air at 900° C. for 5 hours to obtain a lithium-cobalt complex oxide ($LiCoO_2$). Next, 92 parts by mass of the lithium-cobalt complex oxide (with an average particle diameter of 5 μm) as a cathode active material, 5 parts by mass of polyvinylidene fluoride as a cathode binder and 3 parts by mass of carbon black as a cathode conductor were mixed to form a cathode mixture, and then the cathode mixture was dispersed in N-methyl-2-pyrrolidone to form paste-form cathode mixture slurry. Next, the cathode mixture slurry was uniformly applied to one surface of the cathode current collector 51A made of aluminum foil (with a thickness of 15 μm), and was dried, and then the cathode mixture slurry was compression molded by a roller press to form the cathode active material layer 51B. Finally, the cathode current collector 51A on which the cathode active material layer 51B was formed was stamped into a pellet.

Next, silicon as an anode material was deposited on one surface of the anode current collector 52A (with a thickness of 25 μm) made of electrolytic copper foil with a roughened surface by a vacuum evaporation method using electron beam bombardment heating to form the anode active material layer 52B including a plurality of anode active material particles, thereby the anode 52 was formed. In the case where the anode active material layer 52B was formed, single-crystal silicon was used as the evaporation source (the anode material), and silicon was deposited while the anode current collector 52A was standing still, thereby the anode active material layer 52B had a single-layer configuration. At that time, when the deposition speed of the anode material or introduction of a gas (an argon gas) into a chamber was adjusted if necessary, as illustrated in Table 1, the average particle area of the plurality of anode active material particles was changed within a range of 1.1 $μm^2$ to 59.4 $μm^2$ both inclusive. The area ratio, and the average circularity of the plurality of anode active material particles in this case were as illustrated in Table 1.

In the case where the average particle area was calculated, the following steps were carried out. First, a surface of the anode 52 (the anode active material layer 52B in a no-charge state) was observed with an SEM at magnifications of 2000 to obtain an SEM image of a predetermined observation area (42 μm long and 64 μm wide). Next, image processing was performed on the SEM image through the use of image processing software iTEM available from KS Olympus Co., Ltd. to make the contour of each anode active material particle clear. Finally, the average particle area of the plurality of anode active material particles was calculated through the use of the above-described image processing software. As a calculation process by the image processing software, IDs were assigned to the plurality of anode active material particles included in the observation area (the plurality of anode active material particles were numbered), and the particle area of each of the plurality of anode active material particles with the IDs was calculated, and then the average value of the particle areas was determined by computing. The average particle area (%) was represented by (the total of the particle areas of the anode active material particles to which the IDs were assigned in the observation area/the total number of the anode active material particles to which the IDs were assigned in the observation area)×100. At that time, to obtain a more average and more reliable value, SEM images of four observation areas were obtained by changing the field of view, and then the average particle area (a value determined by dividing the total of the particle areas in the observation areas from four fields of view by the total number of particles in the observation areas from four fields of view) was determined on the basis of the SEM images of four observation areas.

In the case where the area ratio was calculated, the same steps as the steps of calculating the above-described average particle area were carried out, except that the particle area of each of the plurality of the anode active material particles with the IDs was calculated, and IDs assigned to the anode active material particles having a particle area of 20 $\mu m^2$ to 30 $\mu m^2$ both inclusive were specified, and then the area ratio was determined by computing. The area ratio (%) was represented by (the total of particle areas of the anode active material particles having a particle area of 20 $\mu m^2$ to 30 $\mu m^2$ both inclusive/the total of the particle areas of the anode active material particles to which the IDs were assigned in the observation area)×100.

In the case where the average circularity was calculated, the same steps as the steps of calculating the above-described average particle area were carried out, except that instead of the particle area and the average particle area, circularities and average circularity were calculated. The average circularity was represented by (the total of circularities of the anode active material particles to which the IDs were assigned in the observation area/the total number of the anode active material particles to which the IDs were assigned in the observation area)×100.

Next, 4-fluoro-1,3-dioxolane-2-one (FEC) and diethyl carbonate (DEC) were mixed as a solvent, and then lithium hexafluorophosphate ($LiPF_6$) was dissolved as an electrolyte salt in the solvent to prepare the electrolyte. At that time, the composition of the solvent (FEC:DEC) was 50:50 at a weight ratio, and the content of the electrolyte salt with respect to the solvent was 1 mol/$dm^3$.

Finally, the cathode 51 was contained in the package can 54 made of metal, and the anode 52, a conducting spacer, if necessary, and the package cup 55 were laminated with the separator 53 in between, and the electrolyte was injected into the package can 54, and then they were caulked by the gasket 56. At that time, a separator (with a thickness of 23 $\mu m$) having a laminate configuration in which a central material film including porous polyethylene as a main component was sandwiched by a film including porous polypropylene as a main component was used, and the cathode active material layer 51B and the anode active material layer 52B were arranged so as to face each other with the separator 53 in between. Thereby, the coin-type secondary batteries were completed. When the secondary batteries were manufactured, the thickness of the cathode active material layer 51B was adjusted, so that lithium metal was prevented from being deposited on the anode 52 in a fully charged state.

Comparative Examples 1-1, 1-2

Secondary batteries were formed by the same steps as those in Examples 1-1 to 1-17, except that the average particle area, the area ratio and the average circularity were changed as illustrated in Table 1.

The cycle characteristics of the secondary batteries of Examples 1-1 to 1-17 and Comparative Example 1-1 and 1-2 were determined. Results are illustrated in Table 1 and FIG. 10.

To determine the cycle characteristics, one cycle of charge and discharge is performed on each of the secondary batteries in an atmosphere at 25° C. to stabilize the battery state, and then each of the secondary batteries was charged and discharged again, and the discharge capacity in the second cycle was determined. Next, the cycle of charge and discharge was repeated until the total cycle number reached 100 cycles in the same atmosphere to determine the discharge capacity in the 100th cycle. Then, a discharge capacity retention ratio (%)=(discharge capacity in the 100th cycle/discharge capacity in the second cycle)×100 was calculated. As the conditions of the first cycle of charge and discharge, each of the secondary batteries was charged at a constant current density of 0.2 mA/$cm^2$ until the battery voltage reached 4.2 V, and each of the secondary batteries was further charged at a constant voltage of 4.2 V until the current density reached 0.05 mA/$cm^2$, and then each of the secondary batteries was discharged at a constant current of 0.2 mA/$cm^2$ until the battery voltage reached 2.5 V. As the conditions of the second and later cycles of charge and discharge, each of the secondary batteries was charged at a current of 0.2 C until the battery voltage reached 4.2 V, and each of the secondary batteries was further charged at a constant voltage of 4.2 V until the current density reached 0.1 mA/$cm^2$, and then each of the secondary batteries was discharged at a current of 0.2 C until the battery voltage reached 2.5 V. In addition "0.2 C" represents a current value at which the theoretical capacity (the discharge capacity in the second cycle) of a battery is fully discharged for 5 hours.

The steps for determining the average particle area or the like by calculation and the steps for determining the above-described cycle characteristics in the following examples and the following comparative examples were the same as those described above.

TABLE 1

Battery configuration: Coin type,
Anode active material layer = Single-layer

| | AVERAGE PARTICLE AREA ($\mu m^2$) | AREA RATIO (%) | AVERAGE CIRCULARITY | DISCHARGE CAPACITY RETENTION RATIO (%) |
|---|---|---|---|---|
| EXAMPLE 1-1 | 1.1 | 0.6 | 0.42 | 58.2 |
| EXAMPLE 1-2 | 2.1 | 3.6 | 0.40 | 72.0 |
| EXAMPLE 1-3 | 4.5 | 8.3 | 0.41 | 80.3 |
| EXAMPLE 1-4 | 5.0 | 10.9 | 0.45 | 85.0 |
| EXAMPLE 1-5 | 7.5 | 17.0 | 0.45 | 86.4 |
| EXAMPLE 1-6 | 7.8 | 17.5 | 0.45 | 87.8 |
| EXAMPLE 1-7 | 8.1 | 18.5 | 0.46 | 86.6 |
| EXAMPLE 1-8 | 10.1 | 23.2 | 0.46 | 90.3 |
| EXAMPLE 1-9 | 16.4 | 37.6 | 0.46 | 86.9 |
| EXAMPLE 1-10 | 18.1 | 43.9 | 0.45 | 82.0 |
| EXAMPLE 1-11 | 25.3 | 48.0 | 0.43 | 75.1 |
| EXAMPLE 1-12 | 35.0 | 33.3 | 0.41 | 74.2 |
| EXAMPLE 1-13 | 39.5 | 18.5 | 0.44 | 72.5 |

TABLE 1-continued

Battery configuration: Coin type,
Anode active material layer = Single-layer

|  | AVERAGE PARTICLE AREA ($\mu m^2$) | AREA RATIO (%) | AVERAGE CIRCULARITY | DISCHARGE CAPACITY RETENTION RATIO (%) |
|---|---|---|---|---|
| EXAMPLE 1-14 | 42.1 | 10.5 | 0.41 | 67.1 |
| EXAMPLE 1-15 | 50.3 | 10.3 | 0.41 | 65.3 |
| EXAMPLE 1-16 | 54.8 | 9.8 | 0.42 | 61.0 |
| EXAMPLE 1-17 | 59.4 | 9.1 | 0.42 | 56.8 |
| COMPARATIVE EXAMPLE 1-1 | 0.9 | 0.3 | 0.43 | 16.4 |
| COMPARATIVE EXAMPLE 1-2 | 61.8 | 8.3 | 0.44 | 35.3 |

Figure 10:
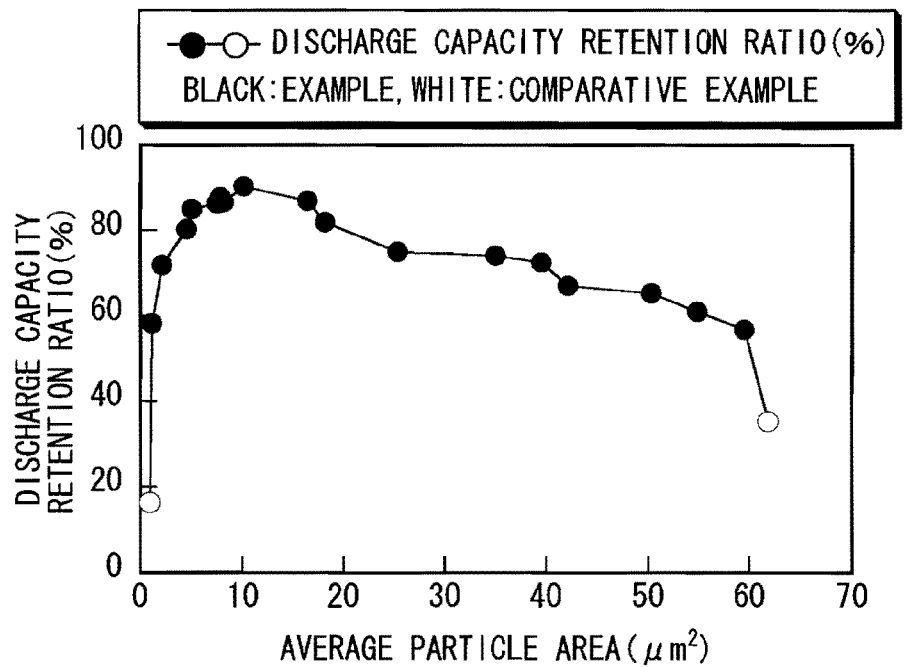
FIG. 10 is a diagram illustrating a correlation between an average particle area and a discharge capacity retention ratio (battery configuration: coin type, anode active material layer: single-layer).

As illustrated in Table 1 and FIG. 10, in the case where the anode active material layer had a single-layer configuration, there was a tendency that as the average particle area increased, the discharge capacity retention ratio increased, then decreased. In this case, in Examples 1-1 to 1-17 in which the average particle area was within a range of 1 $\mu m^2$ to 60 $\mu m^2$ both inclusive, compared to Comparative Examples 1-1 and 1-2 in which the average particle area was out of the range, the discharge capacity retention ratio was remarkably increased. Moreover, in Examples 1-1 to 1-17, when the average particle area was within a range of 2 $\mu m^2$ to 40 $\mu m^2$ both inclusive, a high discharge capacity retention ratio of 70% or over was obtained, and when the average particle area was within a range of 5 $\mu m^2$ to 17 $\mu m^2$ both inclusive, a very high discharge capacity retention ratio of 85% or over was obtained.

Therefore, it was confirmed that in the secondary battery according to the embodiment of the invention, in the case where the anode active material layer had a single-layer configuration, when the average particle area of a plurality of anode active material particles observed from a surface of the anode active material layer was within a range of 1 $\mu m^2$ to 60 $\mu m^2$ both inclusive, the cycle characteristics were improved. In this case, it was confirmed that when the average particle area was within a range of 2 $\mu m^2$ to 40 $\mu m^2$ both inclusive, more specifically within a range of 5 $\mu m^2$ to 17 $\mu m^2$ both inclusive, the characteristics were further improved.

Examples 2-1 to 2-6

Secondary batteries were formed by the same steps as those in Examples 1-1 to 1-17, except that the area ratio was changed within a range of 9.7% to 63.0% both inclusive as illustrated in Table 2 by adjusting the deposition speed of the anode material or the introduction of a gas into the chamber. At that time, the average particle area and the average circularity were as illustrated in Table 2.

Figure 11:
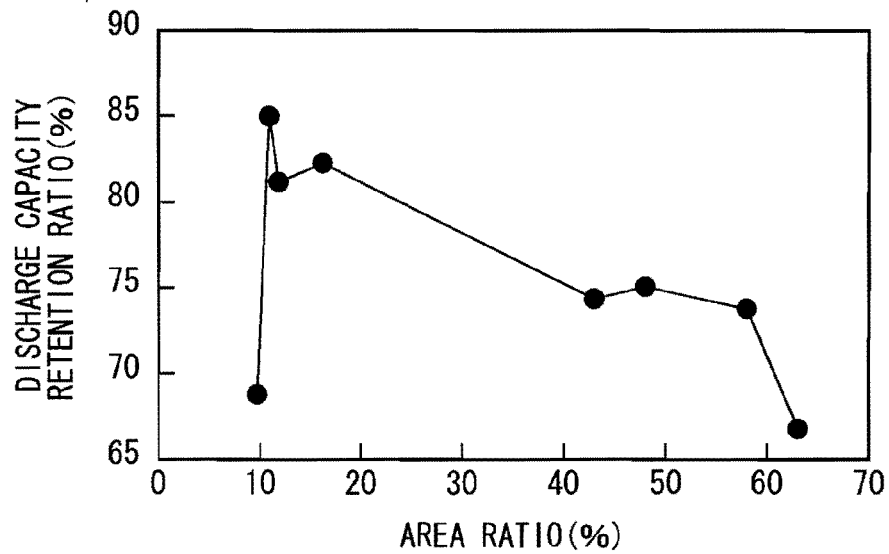
FIG. 11 is a diagram illustrating a correlation between an area ratio and a discharge capacity retention ratio (battery configuration: coin type, anode active material layer: single-layer).

When the cycle characteristics of the secondary batteries of Examples 2-1 to 2-6 were determined, results illustrated in Table 2 and FIG. 11 were obtained.

TABLE 2

Battery configuration: Coin type,
Anode active material layer = Single-layer

|  | AVERAGE PARTICLE AREA ($\mu m^2$) | AREA RATIO (%) | AVERAGE CIRCULARITY | DISCHARGE CAPACITY RETENTION RATIO (%) |
|---|---|---|---|---|
| EXAMPLE 2-1 | 5.3 | 9.7 | 0.43 | 68.8 |
| EXAMPLE 1-4 | 5.0 | 10.9 | 0.45 | 85.0 |
| EXAMPLE 2-2 | 24.6 | 11.8 | 0.44 | 81.2 |
| EXAMPLE 2-3 | 5.2 | 16.2 | 0.43 | 82.3 |
| EXAMPLE 2-4 | 24.5 | 43.0 | 0.44 | 74.4 |
| EXAMPLE 1-11 | 25.3 | 48.0 | 0.43 | 75.1 |
| EXAMPLE 2-5 | 24.8 | 58.0 | 0.42 | 73.8 |
| EXAMPLE 2-6 | 26.1 | 63.0 | 0.41 | 66.8 |

As illustrated in Table 2 and FIG. 11, there was a tendency that as the area ratio increased, the discharge capacity retention ratio increased, then decreased. In this case, when the area ratio was within a range of 10% to 60% both inclusive, a high discharge capacity retention ratio of 70% or over was obtained.

Therefore, it was confirmed that in the secondary battery according to the embodiment of the invention, when the area ratio was within a range of 10% to 60% both inclusive, the cycle characteristics were further improved.

Examples 3-1 to 3-17

Laminate film type secondary batteries illustrated in FIGS. 7 and 8 were manufactured. At that time, the secondary batteries were lithium-ion secondary batteries in which the capacity of the anode 34 was represented on the basis of insertion and extraction of lithium.

First, the cathode 33 was formed by the same steps as those in Examples 1-1 to 1-17, except that the cathode active material layer 33B was formed on both surfaces of the cathode current collector 33A.

Next, the anode 34 was formed by the same steps as those in Examples 1-1 to 1-17, except that the anode active material layer 34B having a multilayer configuration was formed on both surfaces of the anode current collector 34A by the evaporation apparatus illustrated in FIG. 3 while the anode current collector 34A was reciprocated. At that time, the number of layers of the anode active material layer 34B on one surface of the anode current collector 34A was 10. Moreover, the anode active material layer 34B was formed so as to have a configuration in which layers of two kinds with different oxygen contents were alternately laminated by introducing an oxygen gas into the evaporation bath 101 during deposition of the anode material, and changing the introduction amount. In particular, in the case where the anode active material layer 34B was formed, as illustrated in Table 3, the average particle area was changed within a range of 1.0 $\mu m^2$ to 57.2 $\mu m^2$ by adjusting the transport speed of the anode current collector 34A, the number of layers of the anode active material layer 34B or the introduction of a gas (an argon gas) into the evaporation bath 101. The area ratio and the average circularity in this case were as illustrated in Table 3. The step of calculating the average particle area, the area ratio and the average circularity was the same as that in Examples 1-1 to 1-17.

The SEM image and the processed image of the SEM image illustrated in FIGS. 2A and 2B are related to the anode 34 in Example 3-8. As a specific breakdown of the area ratio in Example 3-8, the area ratio was 27.0% in anode active material particles having a particle area of smaller than 10 $\mu m^2$, 33.0% in anode active material particles having a particle area of 10 $\mu m^2$ to smaller than 20 $\mu m^2$, 28.0% in anode active material particles having a particle area of 20 $\mu m^2$ to smaller than 30 $\mu m^2$ and 12% in anode active material particles having a particle area of 30 $\mu m^2$ or over.

The electrolyte was prepared by the same steps as those in Examples 1-1 to 1-17, and then the cathode 33, the anode 34 and the electrolyte were used to assemble each of the secondary batteries. First, the cathode lead 31 made of aluminum was welded to an end of the cathode current collector 33A, and the anode lead 32 made of nickel was welded to an end of the anode current collector 34A. Next, the cathode 33, the separator 35 (with a thickness of 25 $\mu m$) made of a microporous polypropylene film, and the anode 34 were laminated and spirally wound to form a spirally wound laminate, and then an outermost portion of the spirally wound laminate was fixed by the protective tape 37 made of an adhesive tape so as to form a spirally wound body as a precursor body of the spirally wound electrode body 30. Next, the spirally wound body was sandwiched between the package members 40 made of a three-layer laminate film (with a total thickness of 100 $\mu m$) formed by laminating a nylon film (with a thickness of 30 $\mu m$), aluminum foil (with a thickness of 40 $\mu m$) and a cast polypropylene film (with a thickness of 30 $\mu m$) in order from outside, and then the edge portions of the package members 40 except for edge portions on one side were adhered by thermal fusion bonding to form a pouched package, thereby the spirally wound body was contained in the package members 40. Next, the electrolyte having the same composition as that in Example 1-1 to 1-17 was prepared, and then the electrolyte was injected into the package members 40 from an opened portion of the package members 40, and the separator 35 was impregnated with the electrolyte, thereby the spirally wound electrode body 30 was formed. Finally, the opened portion of the package members 40 were sealed by thermal fusion bonding in a vacuum atmosphere, thereby the laminate film type secondary batteries were completed. In the secondary batteries, the thickness of the cathode active material layer 33B was adjusted, so that lithium metal was prevented from being deposited on the anode 34 in a fully-charged state.

Comparative Examples 2-1 and 2-2

Secondary batteries were formed by the same steps as those in Examples 3-1 to 3-17, except that the average particle area, the area ratio and the average circularity were changed as illustrated in Table 3.

Figure 12:
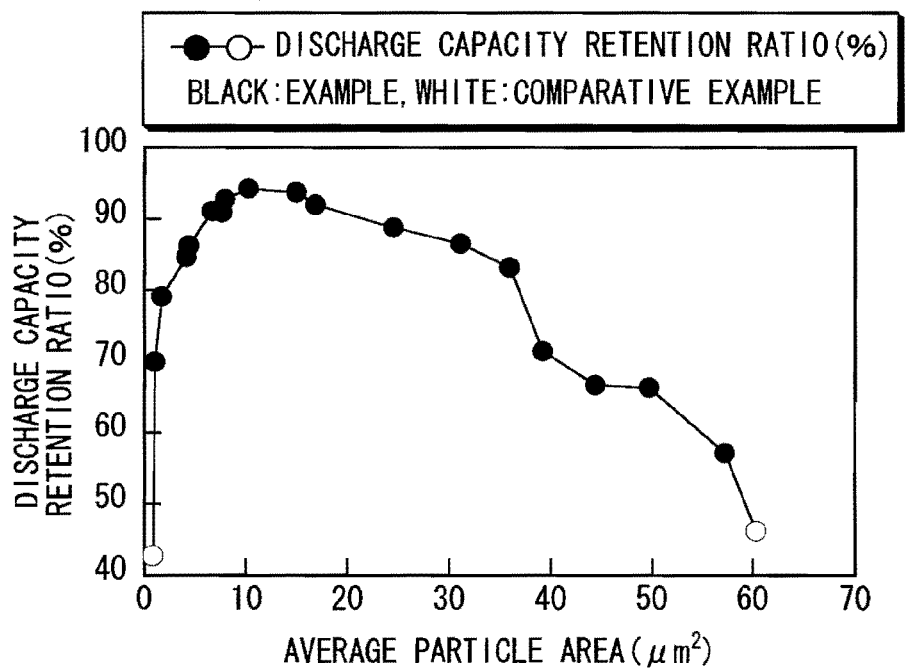
FIG. 12 is a diagram illustrating a correlation between an average particle area and a discharge capacity retention ratio (battery configuration: laminate film type, anode active material layer: multilayer).

When the cycle characteristics of the secondary batteries of Examples 3-1 to 3-17 and Comparative Examples 2-1 and 2-2 were determined, results illustrated in Table 3 and FIG. 12 were obtained.

TABLE 3

Battery configuration: Laminate film type,
Anode active material layer = Multilayer

| | AVERAGE PARTICLE AREA ($\mu m^2$) | AREA RATIO (%) | AVERAGE CIRCULARITY | DISCHARGE CAPACITY RETENTION RATIO (%) |
|---|---|---|---|---|
| EXAMPLE 3-1 | 1.0 | 0.6 | 0.46 | 69.9 |
| EXAMPLE 3-2 | 1.7 | 9.7 | 0.46 | 79.1 |
| EXAMPLE 3-3 | 4.1 | 10.6 | 0.48 | 84.7 |

TABLE 3-continued

Battery configuration: Laminate film type,
Anode active material layer = Multilayer

| | AVERAGE PARTICLE AREA ($\mu m^2$) | AREA RATIO (%) | AVERAGE CIRCULARITY | DISCHARGE CAPACITY RETENTION RATIO (%) |
|---|---|---|---|---|
| EXAMPLE 3-4 | 4.3 | 12.2 | 0.50 | 86.3 |
| EXAMPLE 3-5 | 6.6 | 16.6 | 0.51 | 91.1 |
| EXAMPLE 3-6 | 7.6 | 17.3 | 0.50 | 90.9 |
| EXAMPLE 3-7 | 7.9 | 18.9 | 0.50 | 92.8 |
| EXAMPLE 3-8 | 10.2 | 28.0 | 0.50 | 94.3 |
| EXAMPLE 3-9 | 14.9 | 38.8 | 0.51 | 93.8 |
| EXAMPLE 3-10 | 16.8 | 45.8 | 0.49 | 92.0 |
| EXAMPLE 3-11 | 24.5 | 49.7 | 0.48 | 88.8 |
| EXAMPLE 3-12 | 31.1 | 35.6 | 0.43 | 86.5 |
| EXAMPLE 3-13 | 35.9 | 21.6 | 0.45 | 83.2 |
| EXAMPLE 3-14 | 39.2 | 13.4 | 0.42 | 71.4 |
| EXAMPLE 3-15 | 44.4 | 11.0 | 0.43 | 66.7 |
| EXAMPLE 3-16 | 49.7 | 9.9 | 0.42 | 66.3 |
| EXAMPLE 3-17 | 57.2 | 9.9 | 0.42 | 57.1 |
| COMPARATIVE EXAMPLE 2-1 | 0.8 | 0.8 | 0.44 | 42.8 |
| COMPARATIVE EXAMPLE 2-2 | 60.3 | 9.2 | 0.41 | 46.2 |

As illustrated in Table 3 and FIG. 12, in the case where the anode active material layer had a multilayer configuration, the same results as those in Table 1 and FIG. 10 were obtained. More specifically, in Examples 3-1 to 3-17 in which the average particle area was within a range of 1 $\mu m^2$ to 60 $\mu m^2$ both inclusive, compared to Comparative Examples 2-1 and 2-2 in which the average particle area was out of the range, the discharge capacity retention ratio was remarkably increased. Moreover, when the average particle area was within a range of 2 $\mu m^2$ to 40 $\mu m^2$ both inclusive, a high discharge capacity retention ratio of 80% or over was obtained, and when the average particle area was within a range of 5 $\mu m^2$ to 17 $\mu m^2$ both inclusive, a very high discharge capacity retention ratio of 90% or over was obtained.

Therefore, it was confirmed that in the secondary battery according to the embodiment of the invention, in the case where the anode active material layer had a multilayer configuration, when the average particle area of a plurality of anode active material particles observed from a surface of the anode active material layer was within a range of 1 $\mu m^2$ to 60 $\mu m^2$ both inclusive, the cycle characteristics were improved. In this case, it was confirmed that when the average particle area was within a range of 2 $\mu m^2$ to 40 $\mu m^2$ both inclusive, more specifically within a range of 5 $\mu m^2$ to 17 $\mu m^2$ both inclusive, the characteristics were further improved.

Examples 4-1 to 4-4

Secondary batteries were formed by the same steps as those in Examples 3-1 to 3-17, except that as illustrated in Table 4, the average circularity was changed within a range of 0.38 to 0.75 both inclusive by adjusting the transport speed of the anode current collector 34A, the deposition speed of the anode material, the number of layers of the anode active material layer 34B, or the introduction of a gas (an argon gas) into the evaporation bath 101. The average particle area and the area ratio in this case were as illustrated in Table 4.

Figure 13:
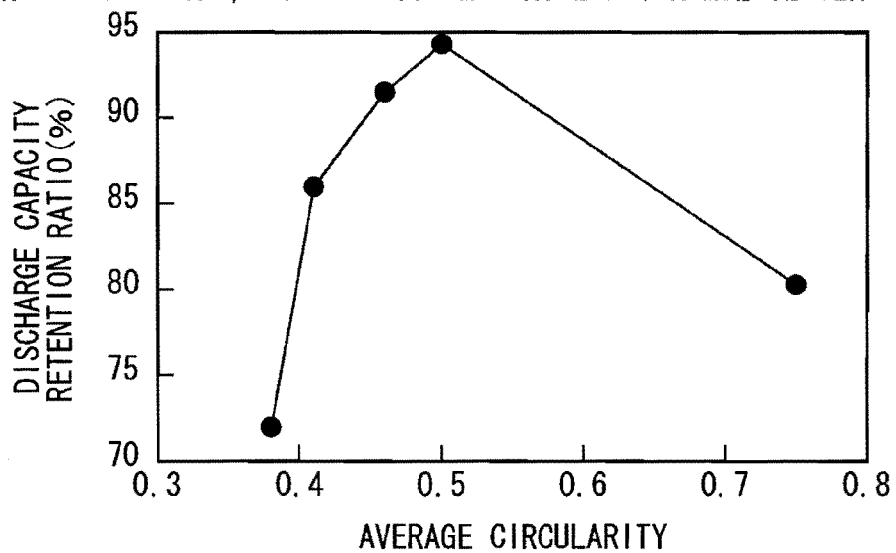
FIG. 13 is a diagram illustrating a correlation between an area ratio and a discharge capacity retention ratio (battery configuration: laminate film type, anode active material layer: multilayer).

When the cycle characteristics of the secondary batteries of Examples 4-1 to 4-4 were determined, results illustrated in Table 4 and FIG. 13 were obtained.

TABLE 4

Battery configuration: Laminate film type,
Anode active material layer = Multilayer

|  | AVERAGE PARTICLE AREA ($\mu m^2$) | AREA RATIO (%) | AVERAGE CIRCULARITY | DISCHARGE CAPACITY RETENTION RATIO (%) |
|---|---|---|---|---|
| EXAMPLE 4-1 | 13.3 | 27.7 | 0.38 | 72.0 |
| EXAMPLE 4-2 | 12.6 | 29.1 | 0.41 | 86.0 |
| EXAMPLE 4-3 | 11.0 | 28.5 | 0.46 | 91.5 |
| EXAMPLE 3-8 | 10.2 | 28.0 | 0.50 | 94.3 |
| EXAMPLE 4-4 | 11.5 | 27.9 | 0.75 | 80.3 |

As illustrated in Table 4 and FIG. 13, there was a tendency that as the average circularity increased, the discharge capacity retention ratio increased, then decreased. In this case, when the average circularity was 0.40 or over, more specifically within a range of 0.4 to 0.8 both inclusive, a high discharge capacity retention ratio of 80% or over was obtained.

Therefore, it was confirmed that in the secondary battery according to the embodiment of the invention, when the average circularity was 0.4 or over, preferably within a range of 0.4 to 0.8 both inclusive, the cycle characteristics were further improved.

It was confirmed from the above-described results in Tables 1 to 4 and FIGS. 10 to 13 that in the secondary battery according to the embodiment of the invention, in the case where the anode active material layer included a plurality of anode active material particles, when the average particle area of the plurality of anode active material particles observed from a surface of the anode active material layer was within a range of 1 $\mu m^2$ to 60 $\mu m^2$ both inclusive, the cycle characteristics were improved independent of the layer configuration (a single-layer or multilayer configuration) or the like of the anode active material layer.

Although the present invention is described referring to the embodiment and the examples, the invention is not specifically limited to the embodiment and the examples, and may be variously modified. For example, the application of the anode of the invention is not limited to secondary batteries, and the anode may be applied to any other electrochemical devices in addition to the secondary batteries. Examples of the other application include a capacitor and the like.

Moreover, in the above-described embodiment and the above-described examples, as the kind of the secondary battery, the lithium-ion secondary battery in which the capacity of the anode is represented on the basis of insertion and extraction of lithium is described; however, the invention is not limited thereto. The secondary battery according to the invention is applicable in the same manner to a secondary battery in which the capacity of an anode includes a capacity on the basis of insertion and extraction of lithium and a capacity on the basis of deposition and dissolution of lithium, and is represented by the sum of them. In the secondary battery, a material capable of inserting and extracting lithium is used as an anode active material, and a chargeable capacity in the anode material capable of inserting and extracting lithium is set to be smaller than the discharge capacity of a cathode.

In the above-described embodiment and the above-described examples, the case where the secondary battery is of a cylindrical type, a laminate film type or a coin type, and the case where the battery element has a spirally wound configuration are described as examples; however, the secondary battery of the invention is applicable in the same manner to the case where a secondary battery has any other shape such as a prismatic type or a button type or the case where the battery element has any other configuration such as a laminate configuration.

In the above-described embodiment and the above-described examples, the case where lithium is used as an electrode reactant is described; however, any other Group 1 element such as sodium (Na) or potassium (K), a Group 2 element such as magnesium (Mg) or calcium (Ca), or any other light metal such as aluminum may be used.

In the above-described embodiment and the above-described examples, an appropriate range, which is derived from the results of the examples, of the average particle area in the anode or the secondary battery of the invention is described; however, the description does not exclude the possibility that the average particle area is out of the above-described range. More specifically, the above-described appropriate range is a specifically preferable range to obtain the effects of the invention, and as long as the effects of the invention are obtained, the average particle area may be deviated from the above-described range to some extent. The same holds for the area ratio, the average circularity or the like.

The present application contains subject matter related to that disclosed in Japanese Priority Patent Application JP 2008-088238 filed in the Japanese Patent Office on Mar. 28, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An anode comprising:
   an anode active material layer on an anode current collector, the anode active material layer including a plurality of anode active material particles,
   wherein,
   the average particle area of the plurality of anode active material particles observed from a surface of the anode active material layer is within a range of and including 1 $\mu m^2$ to 60 $\mu m^2$,
   the average circularity of the plurality of anode active material particles is within a range of and including 0.4 to 0.8, and
   an area ratio of the total sum of the particle areas of anode active material particles having a particle area of 20 $\mu m^2$ to 30 $\mu m^2$, both inclusive, to the total sum of the particle areas of the plurality of the anode active material particles is within a range of 10% to 60%, both inclusive.

2. The anode according to claim 1, wherein the average particle area is within a range of and including 2 $\mu m^2$ to 40 $\mu m^2$.

3. The anode according to claim 2, wherein the average particle area is within a range of and including 5 $\mu m^2$ to 17 $\mu m^2$.

4. The anode according to claim 1, wherein the anode active material layer is formed by a vapor-phase method, a liquid-phase method, a sintering method or a spraying method.

5. The anode according to claim 1, wherein the anode active material particles include at least one kind selected from the group consisting of a simple substance, alloys and compounds of silicon.

6. The anode according to claim 1, wherein the anode active material layer includes a plurality of layers of two kinds having different oxygen contents in a thickness direction.

7. The anode according to claim 1, wherein the anode active material layer is alloyed with the anode current collector.

8. A secondary battery comprising:
a cathode;
an anode; and
an electrolyte,
wherein,
the anode includes an anode active material layer on an anode current collector, the anode active material layer including a plurality of anode active material particles,
the average particle area of the plurality of anode active material particles observed from a surface of the anode active material layer is within a range of and including 1 $\mu m^2$ to 60 $\mu m^2$,
the average circularity of the plurality of anode active material particles is within a range of and including 0.4 to 0.8, and
an area ratio of the total sum of the particle areas of anode active material particles having a particle area of 20 $\mu m^2$ to 30 $\mu m^2$, both inclusive, to the total sum of the particle areas of the plurality of the anode active material particles is within a range of 10% to 60%, both inclusive.

9. The secondary battery according to claim 8, wherein the average particle area is within a range of and including 2 $\mu m^2$ to 40 $\mu m^2$.

10. The secondary battery according to claim 9 wherein the average particle area is within a range of and including 5 $\mu m^2$ to 17 $\mu m^2$.

11. The secondary battery according to claim 8 wherein the anode active material layer is formed by a vapor-phase method, a liquid-phase method, a sintering method or a spraying method.

12. The secondary battery according to claim 8, wherein the anode active material particles include at least one kind selected from the group consisting of a simple substance, alloys and compounds of silicon.

13. The secondary battery according to claim 8, wherein the anode active material layer includes a plurality of layers of two kinds having different oxygen contents in a thickness direction.

14. The secondary battery according to claim 8, wherein the anode active material layer is alloyed with the anode current collector.

* * * * *